US008805783B2

(12) United States Patent
Muhunthan et al.

(10) Patent No.: US 8,805,783 B2
(45) Date of Patent: Aug. 12, 2014

(54) SYNCHRONIZATION OF SUBSETS OF DATA INCLUDING SUPPORT FOR VARYING SET MEMBERSHIP

(75) Inventors: Siva Muhunthan, Kirkland, WA (US); Lev Novik, Bellevue, WA (US); Michael Clark, Redmond, WA (US); Andrei Maksimenka, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 111 days.

(21) Appl. No.: 12/915,795

(22) Filed: Oct. 29, 2010

(65) Prior Publication Data

US 2011/0295796 A1    Dec. 1, 2011

Related U.S. Application Data

(60) Provisional application No. 61/349,076, filed on May 27, 2010.

(51) Int. Cl.
*G06F 17/30*    (2006.01)

(52) U.S. Cl.
CPC ............................. *G06F 17/30575* (2013.01)
USPC .......................................... 707/626; 707/638

(58) Field of Classification Search
USPC .................... 707/612, 614, 626, 638; 711/117
See application file for complete search history.

(56) References Cited

U.S. PATENT DOCUMENTS

| | | | |
|---|---|---|---|
| 5,884,325 A | 3/1999 | Bauer | |
| 6,226,650 B1 | 5/2001 | Mahajan | |
| 6,718,372 B1 * | 4/2004 | Bober | 709/217 |

(Continued)

OTHER PUBLICATIONS

Taper: "Tiered Approach for Eliminating Redundancy in Replica Synchronization", Published Date: 2005; 14 Pages http://www.usenix.org/events/fast05/tech/full_papers/jain/jain.pdf.

(Continued)

*Primary Examiner* — Marc Filipczyk
(74) *Attorney, Agent, or Firm* — Nicholas Chen; Raghu Chinagudabha; Micky Minhas

(57) ABSTRACT

An efficient way and general mechanism is provided to represent and exchange knowledge and/or partial knowledge across nodes when synchronizing between any two nodes including custom or move filters where set membership can change over time at a device as data items come in and out of filter scope. A first node sends a second node its knowledge and/or partial knowledge, including objects and versions of those objects. The second node compares its knowledge and/or partial knowledge with the knowledge and/or partial knowledge of the first node, and then sends the first node any latest versions of objects of which the first node is unaware. In addition, the second node sends its knowledge and/or partial knowledge to the first node. The first node then performs a similar object-by-object version comparison to determine any conflicts due to independent evolution of objects and any changes that can be sent to the second node in order to bring the objects of the second node up to date with the knowledge and/or partial knowledge of the first node. Replicas can track filters to efficiently support synchronizing with filtered replicas. Filter forgotten knowledge is also used to represent how recently a replica can guarantee to know which items have been in the filter. Ghosts can be used to represent items that have been in the filter recently but have currently moved out. Filter forgotten knowledge concept allows both new filters to be tracked when they are introduced into the community, as well as periodically cleaning up of tombstones and ghosts.

19 Claims, 17 Drawing Sheets

(56) References Cited

U.S. PATENT DOCUMENTS

| | | | |
|---|---|---|---|
| 7,290,019 B2 * | 10/2007 | Bjorner et al. | 707/638 |
| 7,529,811 B2 | 5/2009 | Thompson | |
| 8,332,358 B2 * | 12/2012 | Kaiser | 707/637 |
| 2005/0044108 A1 | 2/2005 | Shah | |
| 2008/0189439 A1 | 8/2008 | Chitre | |
| 2009/0077002 A1 | 3/2009 | Clark | |
| 2009/0083441 A1 * | 3/2009 | Clark et al. | 709/248 |
| 2009/0193149 A1 | 7/2009 | Khosravy | |
| 2009/0318168 A1 | 12/2009 | Khosravy | |

OTHER PUBLICATIONS

"Database Replication in Microsoft Jet 4.0", Published Date: Jan. 1999; 20 Pages http://msdn.microsoft.com/en-us/library/aa140024%28office.10%29.aspx.

* cited by examiner

SYNCHRONIZATION OF SUBSETS OF DATA INCLUDING SUPPORT FOR VARYING SET MEMBERSHIP

CROSS-REFERENCE TO RELATED APPLICATIONS

This application claims priority to U.S. Provisional Application Ser. No. 61/349,076, filed on May 27, 2010, entitled "SYNCHRONIZATION OF SUBSETS OF DATA INCLUDING SUPPORT FOR VARYING SET MEMBERSHIP", the entirety of which is incorporated herein by reference.

TECHNICAL FIELD

The subject disclosure relates to efficient multi-master synchronization of subsets of data between endpoints such as devices and computers, and where set membership can vary over time.

BACKGROUND

There are a variety of distributed data systems that have nodes (e.g., computers or devices) that share data with one another. For instance, music sharing systems may synchronize music between a PC, a Cell phone, a gaming console and an MP3 player. For another example, email data may be synchronized between an e-mail server and e-mail clients on PCs or other devices. Conventionally, to the extent such devices synchronize according to common information, the synchronization takes place according to a static setup among the devices.

Because of limited storage availability on different devices or computers, as well as limited network bandwidth availability between them, synchronizing a subset of the data is essential in many scenarios. Correct functionality in such scenarios requires every node maintain the most recent copy of all the desired data. At the same time synchronization of such subsets needs to be performed efficiently. A common problem with existing solutions is synchronization metadata grows proportional to the number of items in the subset, rather than proportional to the number of nodes involved in synchronization.

Another problem is how to synchronize and represent only a subset of information known by other device(s). For instance, this might happen where a device or application is not storing the same data that a second device stores or uses, e.g., different endpoints can store different subsets. For instance, a first device might be a personal computer (PC) with lots of storage and stores all music items on behalf of a user, whereas a handheld device that synchronizes with the PC may have limited storage in which case only music items rated with 5 stars by the user are stored. In such case, the handheld device may only receive a subset of the files from the PC, e.g., only those files on the PC that are rated with 5 stars. How to represent on the handheld device in a loosely coupled multi-master synchronization environment that the handheld device received a subset of data from the PC is a challenge. Compounding the challenge is when multiple devices are synchronizing. For instance, in addition to the handheld device and the PC, a user's laptop may store all music items with 3 stars or greater.

Conventional synchronization systems suffer from either or both of 1) non-convergence due to not handling items that move out of the filter, which leads to unacceptable results or 2) metadata growth is proportional to the number of items in the subset due to sending and storing metadata for all items including those items that have never been in the subset, which leads to unscalable systems and/or difficulties for devices with limited storage or processing capabilities as well as leading to incorrect data, incorrect behavior, or higher storage requirements. Thus, conventionally, for loosely coupled devices in a multi-master system, there is no efficient and flexible way to represent synchronization metadata for the subset of the data that is of interest. In essence, tracking how items move in and out of the subset, and how such subsets of data are exchanged among the devices in such a system is a difficult and challenging problem thus far unaddressed by those in the synchronization field.

Still further, other conventional systems in essence ignore the problem by allowing the full set of synchronization metadata (e.g., knowledge) on each device to synchronize to each of the other devices. Where a device does not recognize the data that was synchronized to its data store, the device marks the data as unrecognizable. While this allows a third device to synchronize with the unrecognizable data on the second device, potentially giving the third device an opportunity to recognize some or all of the unrecognizable data, the proliferation of unrecognizable data on devices with limited storage is unworkable as a practical matter. More generally, storing all of the data in this fashion achieves nothing more than a backup system where each device backs up its data to all other devices of a network, an inefficient scheme to say the least.

In general, synchronization or replication refers to the act of keeping multiple copies of data at different replicas the same, as well as detecting and reporting conflicts for concurrent changes to same data on different replicas. Replicas can reside on different locations such as a computer, device, or cloud. Synchronization systems have to deal with changes happening on different replicas, efficiently replicating them while detecting conflicts to ensure there is no data loss.

Filtering refers to synchronizing a subset of the data. There are different types of filtering related to synchronization, and arbitrary filters where data can move in and out of the filters currently has no known efficient solutions, with examples of such difficult synchronization scenarios as follows.

As mentioned, a first example is synchronizing music albums, and tracks between a PC and device where device only keeps music that user rates as "5 stars" and where another device keeps music that a user rates as 3 or more stars. Since the user can change ratings of music, this causes data to move in and out of the filter. This relatively straightforward example involving just three devices is illustrated in FIG. 1. PC 100 stores all music 102. Handheld device 110 stores music rated with 5 stars 112 and laptop 120 stores music rated with 3 or more stars 122. Since the set membership of music 112 and 122 can change a lot as a user adds or deletes music, or re-rates existing music, the synchronization problem is not straightforward to handle.

Another example is synchronizing customer data between a relational database that keeps all customer records including those applicable to a given sales person. On the sales person's laptop client, the sales person only wants to keep data for customers with which that sales person works, e.g., those customers with state='WA'. Since customer addresses can change to states other than 'WA', data can move in and out of the filter applicable to the laptop or other client. This example illustrates the sheer complexity of the number of devices that can be involved since a sales force of sales people may include hundreds of people and thousands of devices possessed by such people, and thus a general and scalable mechanism for resolving how to keep track of what information each device knows, track and can therefore receive as part of synchronization processes is desirable.

In this regard, existing filtering solutions have the drawback of either move filters that take the step of exchanging filter membership (e.g., all items are in the filter) or sending updates to all items (e.g., including those not in the filter). For instance, based on the example above with a database filter of customers in state='WA', synchronizing changes to all data (e.g., customers in all other states) is extremely inefficient and undesirable.

Accordingly, flexible and efficient ways to represent synchronization metadata transfers of data from one device to another device are desired for a variety of loosely coupled devices, where the device transfers a subset of its knowledge to the other device and where set membership can vary. Additional detail about these and other deficiencies in the current state of synchronization among loosely coupled devices, and with respect to synchronizing subsets of data among the devices, may become apparent from the description of the various embodiments of the detailed description that follows.

SUMMARY

In consideration of the need for exchanging synchronization metadata between nodes of a synchronization network, which may independently evolve common information to be synchronized across the nodes, an efficient way is provided to represent and exchange the synchronization metadata when is performed to one or more subsets of data without the downsides of conventional approaches.

In various embodiments, replicas can efficiently support synchronization of subsets by tracking the filter that defines the subset replica tracking filters. A replica is said to track a filter if the replica knows which items have recently been in the filter. Filter forgotten knowledge is used to represent how recently a replica can guarantee to know which items have been in the filter. Ghosts can be used to represent items that have been in the filter recently but have currently moved out. Another aspect is that the filters used in the community of synchronizing devices need not be known in advance, that is, a new replica with new filter(s) can be added to and supported by the synchronization community at any time as if the new replica was added before, or from the beginning of synchronization among other devices.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follows.

BRIEF DESCRIPTION OF THE DRAWINGS

The system and methods for representing synchronization knowledge for multiple nodes sharing subsets of a set of information are further described with reference to the accompanying drawings in which.

DETAILED DESCRIPTION

Overview

Figure 1:
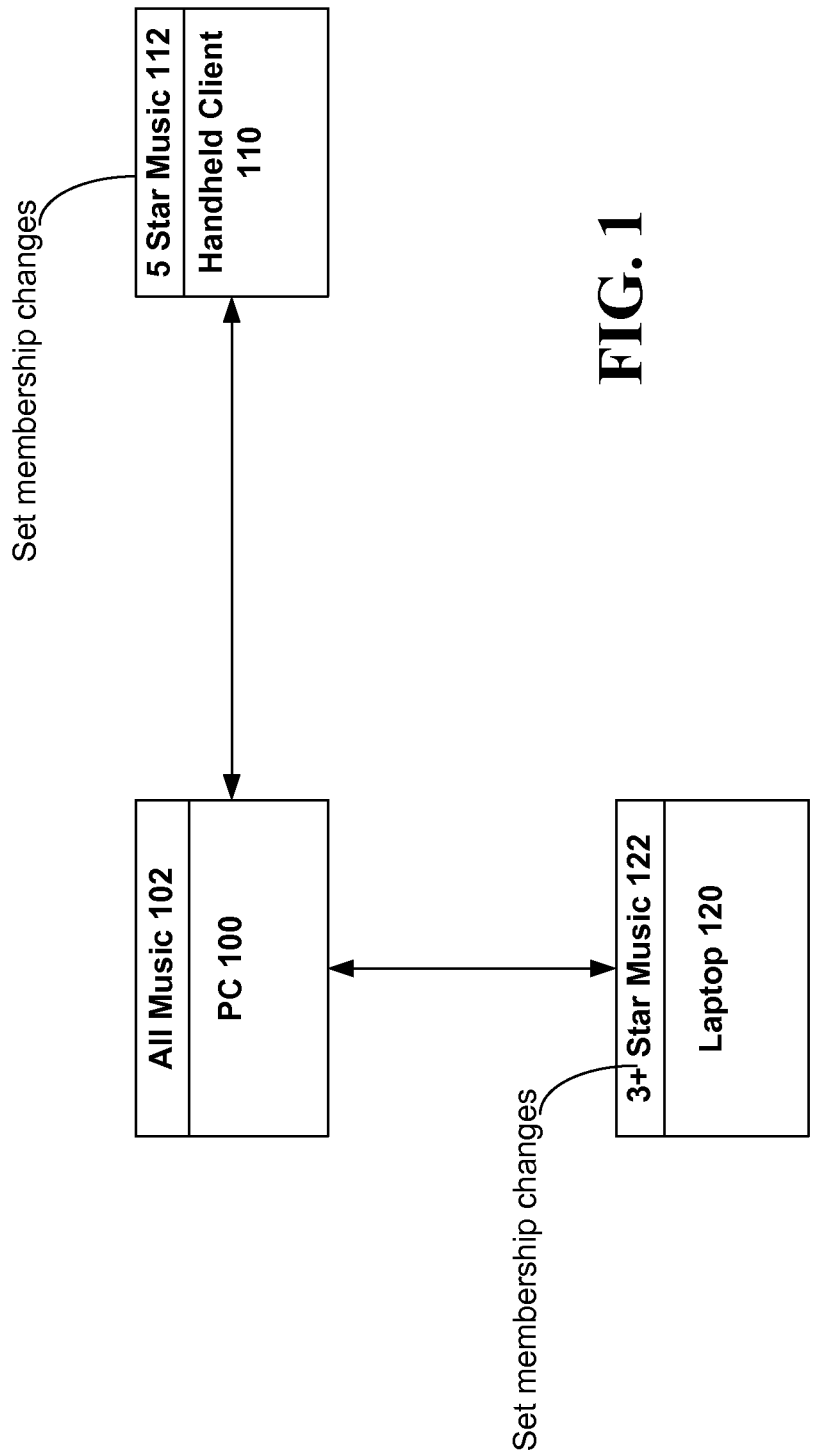
FIG. 1 illustrates a synchronization system that provides synchronization between three endpoints of the system synchronizing different sets or subsets of music data items.

As generally discussed in the background, particularly where synchronization metadata exchanges can occur among the multiple nodes according to different filters with data set membership changing, the complete picture can become cumbersome and difficult to describe in hard-coded metadata, even where devices can be presume to remain connected. Specifically, efficient and correct synchronization of scenarios like this where data moves in and out of the filter is complex and difficult, and currently unsolved by conventional solutions in a widely applicable manner without significant drawbacks.

Accordingly, in various embodiments, replicas can track filters via replica tracking filters. A replica is said to track a filter if the replica knows which items have recently been in the filter. In this regard, synchronization metadata, termed knowledge, is generally described in U.S. patent application Ser. No. 11/673,129, filed Feb. 9, 2007, which is incorporated herein by reference in its entirety. As detailed therein, knowledge can be employed as concise synchronization metadata for multi-master synchronization. Using the same knowledge concept at times of metadata or tombstone cleanup can guarantee correct synchronization, as described generally in U.S. Patent Publication No. 2007/0299887, filed Jun. 23, 2006, also incorporated herein by reference in its entirety. In addition, forgotten knowledge can be utilized, which generally relates to metadata information associated with a set of data objects that has been removed, deleted or otherwise purged, typically because of a cleanup operation or the like. Forgotten knowledge can employ the same format and semantics as knowledge, with metadata or tombstone cleanup to guarantee correctness of synchronization. Ghosts can be used to represent items that have been in the filter recently, but have currently moved out. Ghosting is described in U.S. Pat. No. 7,720,890, issued May 18, 2010, which is incorporated herein by reference in its entirety.

In consideration of such need to efficiently describe filtered synchronization in a multi-master synchronization system where set membership as defined by the filter can vary, various embodiments provide an efficient and flexible way to track and describe the evolution of knowledge, and succinctly represent present knowledge of the devices in the system as a function of partial knowledge, or subsets of knowledge, learned from other devices. In one embodiment, a knowledge vector with versioning information is used to represent knowledge, and subsets of data being synchronized include additional metadata that efficiently describes the partial knowledge exchange as such. In this regard, replicas can track filters via replica tracking filters. A replica is said to track a filter if the replica knows which items have recently been in the filter. Filter forgotten knowledge is used to represent how recently a replica can guarantee to know which items have been in the filter. Ghosts can be used to represent items that have been in the filter recently but have currently moved out.

Another aspect of the various embodiments disclosed herein is that the filters used in the community of synchronizing devices need not be known in advance. For example, in the customer data example set forth in the background, when a new replica is added to the sync community with "all customers with age>65", the existing replicas can start tracking from that point in time onwards and support the new replica efficiently as if the replica was supported from the beginning along with the other synchronizing devices. In other words, the systems disclosed herein can support a new replica with new filter(s) including scenarios where set membership (as defined by the filter) can vary over time and/or at any time the replica is added to the synchronization community.

As a general roadmap for what follows herein, first, a general mechanism is described that ensures whenever a device has access to other device(s) in a loosely coupled network, the device will exchange knowledge with the other device(s) in order to determine which changes can be retrieved by the device and conveyed to the other device(s). Then, it is shown how the general mechanism for knowledge exchange can be extended to include representations of filtered synchronization where filter membership varies over time.

In this fashion, while a first device and a third device may never communicate directly, if each is able to connect to a second device, a collective share of knowledge can be achieved across all three devices, determining what changes each of the devices can receive from each of the other devices. With various embodiments, partial knowledge learned at the second device from the first device and partial knowledge learned from the third device can be combined into a single representation of all the knowledge understood by the second device, which in turn can be synchronized to the other devices.

Considering the proliferation of devices that share data, such as music, email, pictures, videos, advantageously, the knowledge exchange techniques of the various embodiments are scalable to any number of devices, and any number of independent filtered knowledge bases where set membership can vary, e.g., different sets of common information, simultaneously, e.g., anywhere any evolving set of devices wish to share whole or partial data. Various embodiments of representing such knowledge or partial knowledge in a distributed system are described in more detail below.

Efficient Knowledge Representation and Exchange

As a prelude to describing the synchronization of subsets of data in an embodiment, in this section, an overview is presented of a general mechanism for efficiently representing knowledge in data synchronization systems. The term knowledge as used in this section refers to synchronization metadata that is exchanged during synchronization, which can be a concise description of all item IDs and versions, e.g., the item IDs and version numbers known by the device, which allow the devices to deduce what other knowledge can be acquired from other devices to which they connect. The general mechanism includes (1) an efficient exchange of knowledge between connected devices by utilizing only the minimum data needed by a first node from a second node to be sent, (2) the ability to efficiently and correctly recognize disagreements over the state of data, i.e., conflicts, between a first node and a second node, (3) the ability to synchronize an arbitrary number of nodes and (4) the ability to synchronize any node via any other node, e.g., the ability to work in a peer to peer, multi-master synchronization environment.

With the general mechanism, any number of changes might be made to the local copy of the data that is available on a device. At any time they become connected, however, by exchanging their knowledge with one another, they become aware of at least the minimum amount of information needed to reconstruct what each other knows and doesn't know to facilitate of changes between the devices. In other words, nodes can pick up changes available from other nodes by sending their knowledge which represents the set of changes they have available locally. For example, knowledge of a device or node represents what set of changes it knows about. Such can include both local changes made by the node, as well as changes made at other nodes that have been applied from previous synchronization operations.

Advantageously, one or more embodiments operate to perform synchronization for a set of devices all interested in maintaining the latest versions of a set of objects, but also allow such devices to come into connection and out of connection with the other objects of the set. Whenever a device comes back into connection with other device(s) via one or more networks, the device performs synchronization to get changes made at other devices or nodes. In this fashion, even loosely connected devices may come into and out of contact with a set of devices, and then relearn all the knowledge missed by coming into contact with any set of devices that possess the latest set of collective knowledge.

Figure 2:
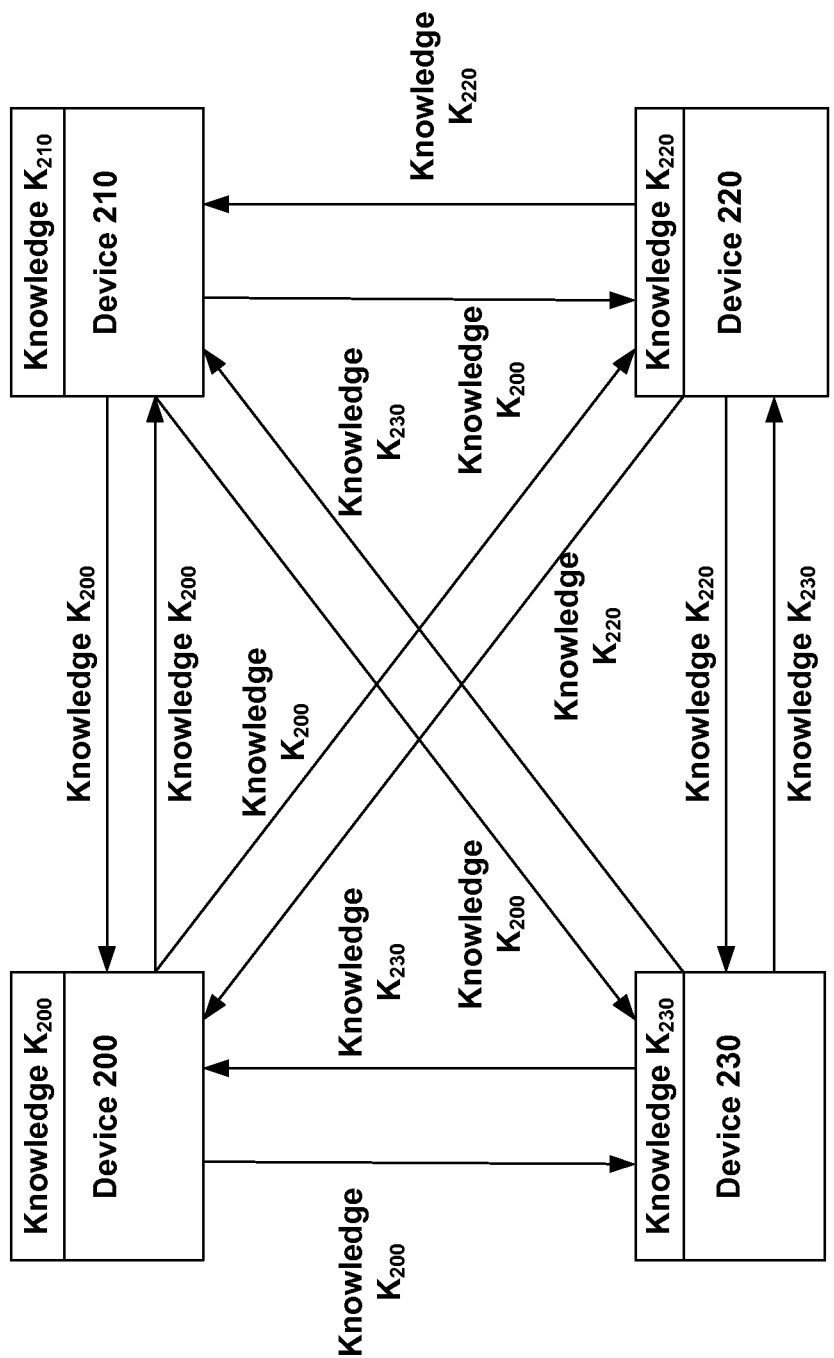
FIG. 2 illustrates exemplary non-limiting knowledge exchange between four nodes of a loosely connected network of nodes in an embodiment.

FIG. 2 illustrates that a knowledge exchange can be generalized, or scalable, to any number of devices. As shown, four devices 200, 210, 220 and 230 are shown with knowledge representations $K_{200}$, $K_{210}$, $K_{220}$ and $K_{230}$ that respectively indicate what each device knows and does not know about a set of common information to be shared across the devices.

Figure 3:
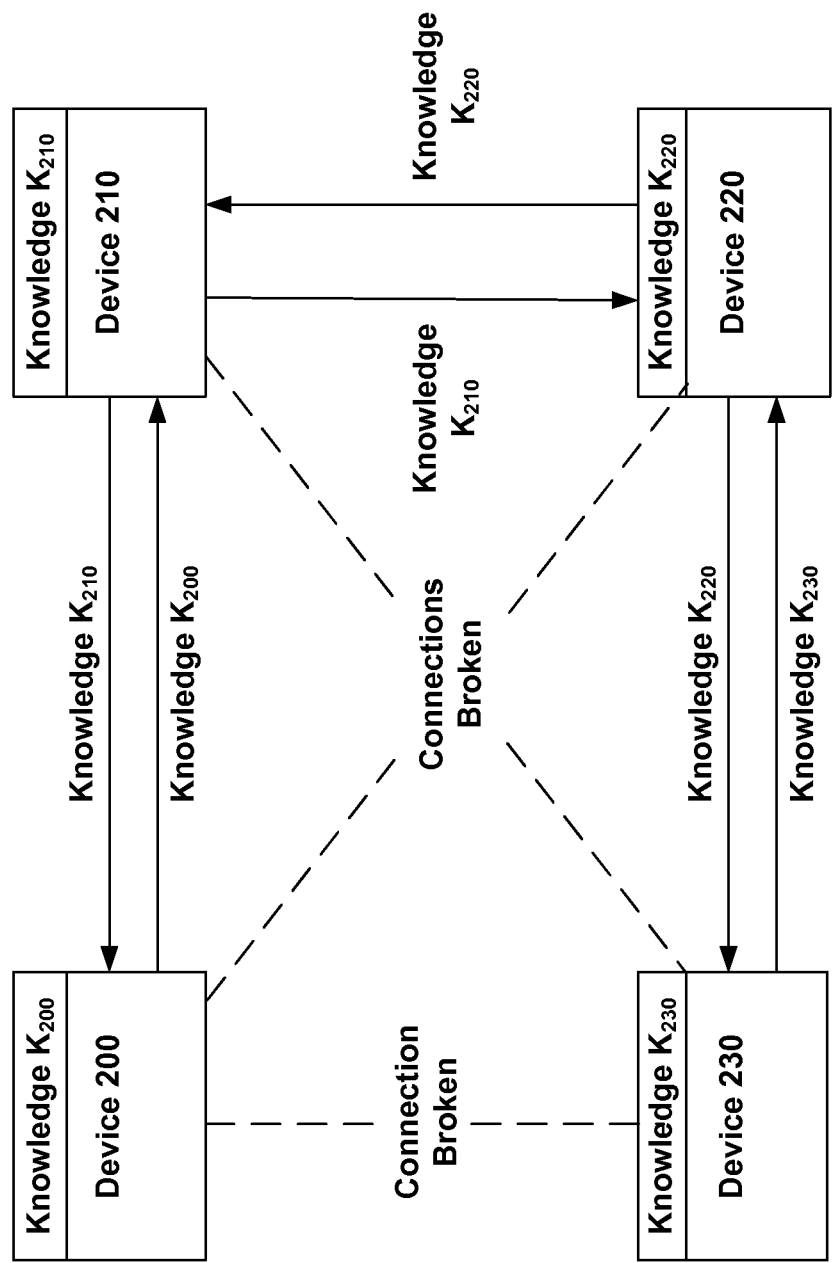
FIG. 3 illustrates exemplary non-limiting knowledge exchange between four nodes of a loosely connected network of nodes in an embodiment when some of the devices become disconnected from one another.

Advantageously, as shown by FIG. 3, even where connections in the network become disconnected, a complete set of knowledge can nonetheless be gained by all of the devices 200, 210, 220, and 230, as long as at least one connection directly or indirectly exists to the other devices. For instance, as shown, knowledge $K_{230}$ of device 230 still reaches device 200 via the knowledge exchange with device 220, then via the knowledge exchange between device 220 and 210, and finally via the knowledge exchange between device 210 and 200.

With more devices sharing knowledge about common information to be shared, all of the devices benefit because the knowledge exchange is agnostic about from which device collective knowledge comes. The devices each independently operate to try to gain as much knowledge about information to be shared among the devices from any of the other devices to which it is connected.

In exemplary non-limiting detail, a method is described in further detail for two nodes to engage in a conversation and at the end of the conversation to have equivalent knowledge for the concerned data set. The method is scalable beyond two nodes by creating a knowledge exchange capability for each new device entering the peer-to-peer network.

Figure 4:
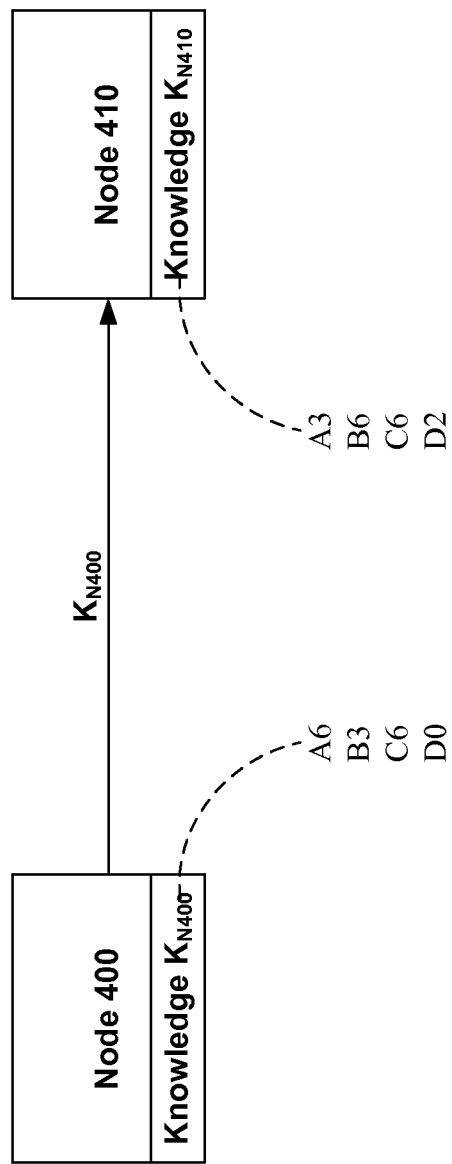
FIGS. 4, 5 and 6 illustrate exemplary knowledge exchange in the context of multiple objects shared among nodes of a network in an embodiment.

Thus, as shown in FIG. 4, node 400 of a peer-to-peer network having any number of nodes wants to exchange data with Node 410. Node A begins by requesting changes from Node 410 and in order to do so Node 400 sends its knowledge (represented as $K_{N400}$) to Node 410 as shown.

Knowledge of a device or node is represented by labeling each object to be shared among devices with a letter identifier, and then the trailing number represents the latest version for this object. For instance, $K_{N400}$ as shown in FIG. 4 includes objects A, B, C and D each to be synchronized between nodes 400 and 410, and the number following each of the objects represents the latest version of the object known on the device. For instance, knowledge $K_{N400}$ at a time t=1 includes the $5^{th}$ version of A, the $4^{th}$ version of B, the $7^{th}$ version of C, and the $1^{st}$ version of D, notated as A4, B3, C6, D0 in FIG. 4. In contrast, knowledge $K_{N410}$ of node 410 at a time t=1 may include the $4^{th}$ version of A, the $7^{th}$ version of B, the $7^{th}$ version of C, and the $3^{rd}$ version of D, notated as A3, B6, C6, D2 in FIG. 4.

Figure 5:
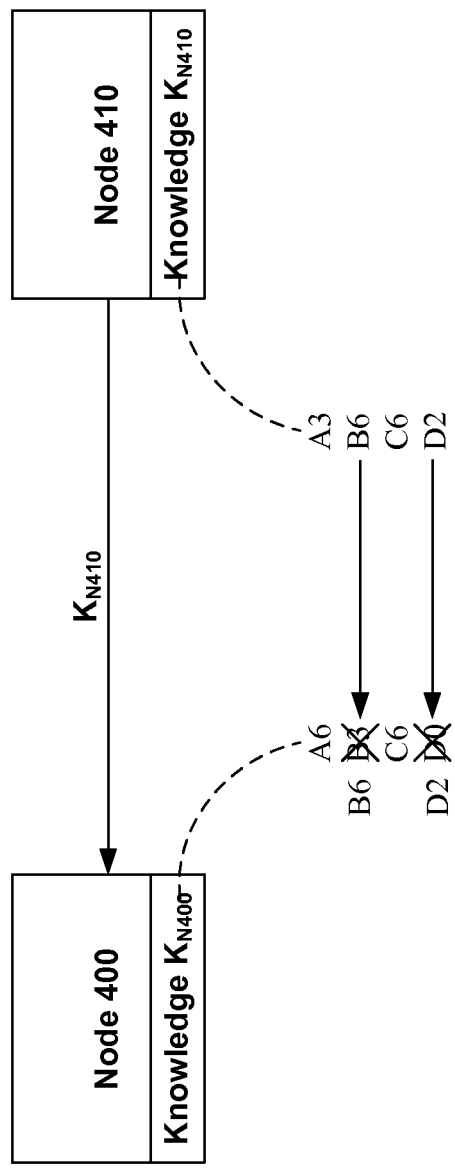

As shown in FIG. 5, at time T=2, node 410 compares knowledge $K_{N400}$ received from node 400 against its own knowledge $K_{N410}$ and determines what needs to be sent to node 400. In this example, as a result, node 410 will send node 400 the changes made by B with tickcount greater than 3, and changes made by D with tickcount greater than 0 are not covered by B3 or D0 and hence will be sent. Along with the changes, the node will send its own knowledge of $K_{N410}$. When node 410 sends node 400 the changes between B6 and B3, and the changes between D2 and D0, it also sends along the latest version of knowledge $K_{N410}$ it has (reflecting whenever the last change on node 410 was made).

Figure 6:
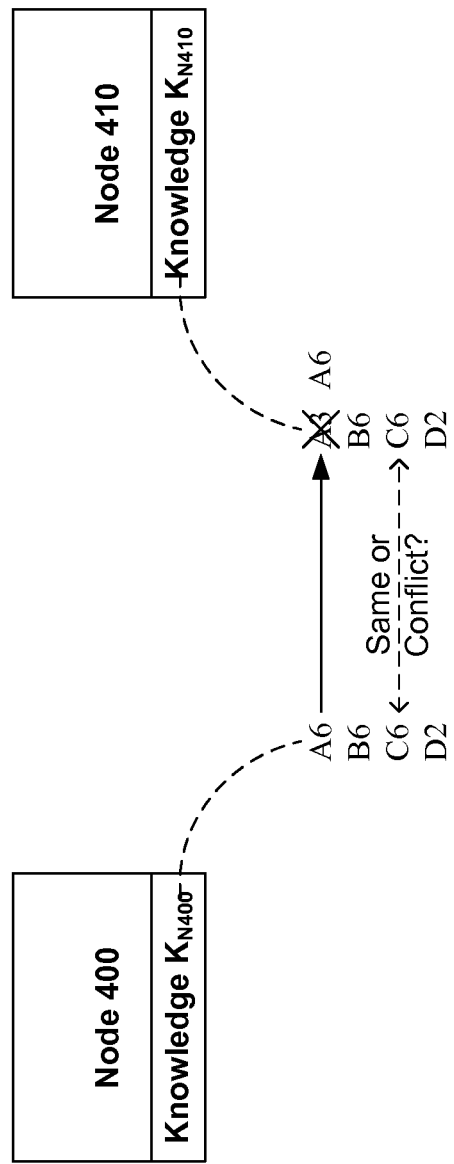

As shown in FIG. 6, representing time t=3, sending knowledge $K_{N410}$ to node 400 allows node 400 to detect conflicts (e.g., store them for later resolution) if it later finds out that both node 400 and node 410 made a change to an object independently. For example, a conflict is not based on two objects not being same, but rather based on destination version not contained by source knowledge, and source change not contained by destination knowledge. Accordingly, such allows for autonomous updating, efficient enumeration, but also correct conflict detection when the nodes meet and exchange changes. For instance, in the example, if C6 is not the same object in both knowledge $K_{N410}$ and $K_{N410}$, e.g., if both independently evolved from C5 to C6, then which C6 is the correct C6 can be set aside for conflict resolution, e.g., according to pre-set policy resolution that befits the synchronization scenario and devices involved.

Figure 7:
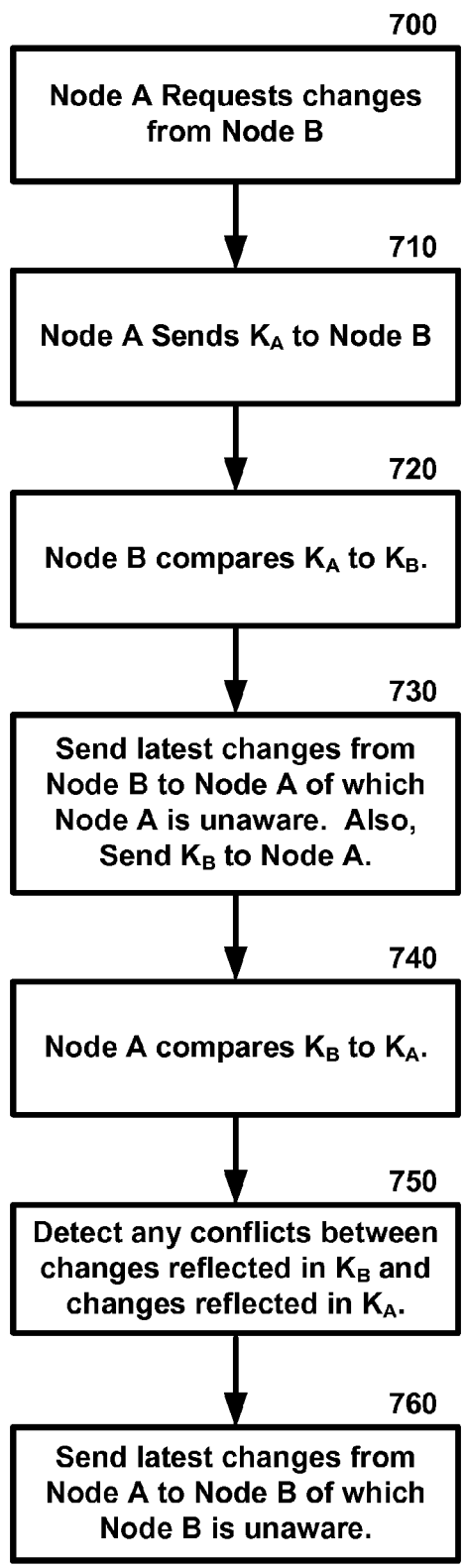
FIG. 7 is an exemplary non-limiting flow diagram illustrating the process for knowledge exchange in the context of multiple objects shared among nodes of a network in an embodiment.

An exemplary knowledge exchange process between any two nodes of a distributed multi-master synchronization environment using the above described general mechanism is shown in the flow diagram of FIG. 7. At 700, node A requests synchronization with node B, thereby asking node B for changes node A does not know about. In order to equip node B, at 710, node A sends its knowledge to node B. At 720, node B compares the knowledge received from node A with the versions of the local copy of the data to determine what changes node B knows about that can be sent to node A. At 730, node B sends such changes to node A, and in addition, node B sends its knowledge to node A so that node A can perform correct conflict detection, and also calculate its new knowledge after applying the changes it received from B at 740.

At 750, node A detects any potential conflicts between latest versions reflected in the knowledge of node B and latest versions reflected in the knowledge of node A, in the event that independent evolution of versions has occurred on node A and node B. In an embodiment, any conflict resolution policy may be applied to determine which node trumps the other node in the event of a conflict. At 760, the latest changes from node A that are not possessed by node B are sent to node B. The conflict resolution policy will additionally dictate whether any changes are sent from node B to node A, or node A to node B, to maintain common information between the nodes. If independent versioning is OK, or desirable, no conflict resolution is another option.

Efficient Knowledge Subset Representation and Exchange

As discussed above in connection with the generalized mechanism for representing knowledge in a multi-master synchronization environment, knowledge of a device or node can be efficiently represented by labeling each object to be shared among devices with a letter identifier including a trailing number that represents the latest version for this object. It should be understood that such labeling is simply a convention used to refer to multiple knowledge objects corresponding to different replicas in documents. The knowledge contents, and representation can be very different. In this regard, knowledge defines the summary of the state based synchronization of a replica. However, as mentioned in the background and overview, in many cases it is useful to synchronize a subset of the data that is contained within a given endpoint, which is complex where data set membership can change over time at the devices. When this happens, the representation of knowledge still works for synchronization purpose even when filtered replicas, or replicas with subset(s), are introduced into the synchronization community. In various embodiments, this is achieved via a filter mechanism and represents subsets as a form of filtered knowledge.

Accordingly, the uses for the subsetting representation as filtered knowledge, as described herein, are virtually limitless. Subsetting of every kind is very popular in synchronization scenarios. Being able to efficiently represent and combine information about filters advantageously allows replicas to only keep data and metadata about the subset they care about and still synchronize according to efficient knowledge exchanges in a multi-master synchronization environment.

In more detail, various embodiments are provided for filters with knowledge based synchronization, as described in the previous section. As mentioned, normally, knowledge is represented as a version vector, representing the maximum tick count a given endpoint has ever seen from any other endpoint in the community with which it synchronizes for a given set of data. Another way of thinking of this vector is as a scope vector since it defines the scope of knowledge of the objects possessed by a device.

Figure 8:
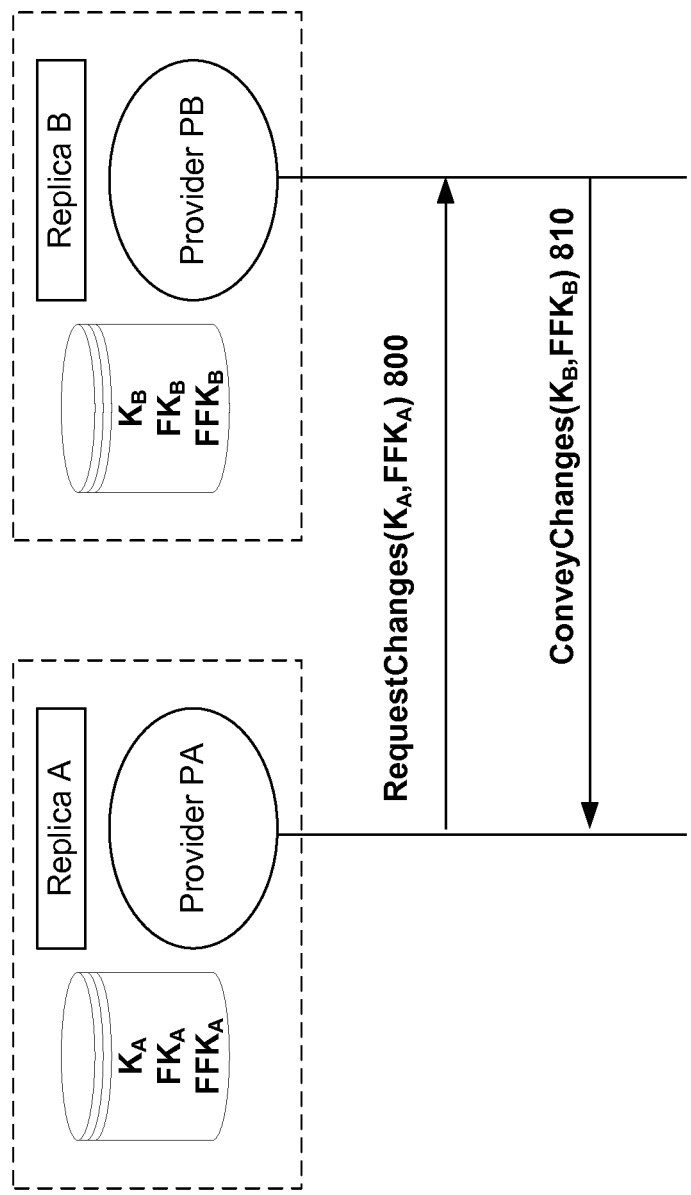
FIG. 8 is a general architecture illustrating the framework for requesting and conveying changes based on knowledge and partial knowledge in an embodiment.

FIG. 8 illustrates a generalized mechanism for exchanging knowledge, e.g., without specifics to filters as described above, but also for the case where the devices are tracking the same filter in which case filter forgotten knowledge, being specific to filters, is also exchanged. For example, consider one of the example scenarios introduced previously, in which replicas represent various stores music stored on various user devices, or represent an enterprise resource planning (ERP) database of customers. In either case, two such replicas, here replica A and replica B, can be tracking, inter alia, the same filter. For instance, replica A and replica B can both be tracking a filter that contains only 5 star music from the set of all music; or in the ERP example, the filter can be associated with a sales agent who only covers the state of Washington, so the filter can be set to contain only customers who reside in "WA".

Filter forgotten knowledge has the same representation as knowledge, but provides a different role than does knowledge with respect to synchronization. As shown, each replica A and B has provider PA and provider PB, respectively. According to one or more embodiments, each replica A and B tracks a filter and thus in addition to maintaining knowledge $K_A$ and $K_B$, respectively, and forgotten knowledge $FK_A$ and $FK_B$, respectively, replica A and B also maintain filter forgotten knowledge $FFK_A$ and $FFK_B$, respectively. Similar to the case with no subsetting or filters (in which case knowledge and forgotten knowledge can be exchanged in connection with syncing), any of the replicas can request changes 800 of another replica and receive changes 810 in response to the other replica conveying changes, including an exchange of knowledge and filter forgotten knowledge.

In either case, knowledge exchange can be handled according to a common scheme, whereby the replica initiating the knowledge exchange (e.g., replica A or the source replica) transmits the change request along all current knowledge, $K_A$, and filter forgotten knowledge, $FFK_A$. Upon receipt of the change request, the destination replica (e.g., replica B) can update its own knowledge, $K_B$, and compare $K_A$ to $FFK_B$ in order to determine whether $K_A$ is contained or a subset of $FFK_B$. If so, such is considered to be a nominal or normal sync operation, and at some time later (possibly with intervening sync operations between replica B and other replicas in the community) replica B can transmit all or a portion of $K_B$ that is unknown to replica A as well as $FFK_B$ to replica A as part of a change conveyance operation. In the event that $K_A$ is not contained or a subset of $FFK_B$, then a normal sync will not typically be used, but rather another type of synchronization, such as a partial sync with line item exceptions or a full enumeration sync, both of which are further detailed herein.

Figure 9:
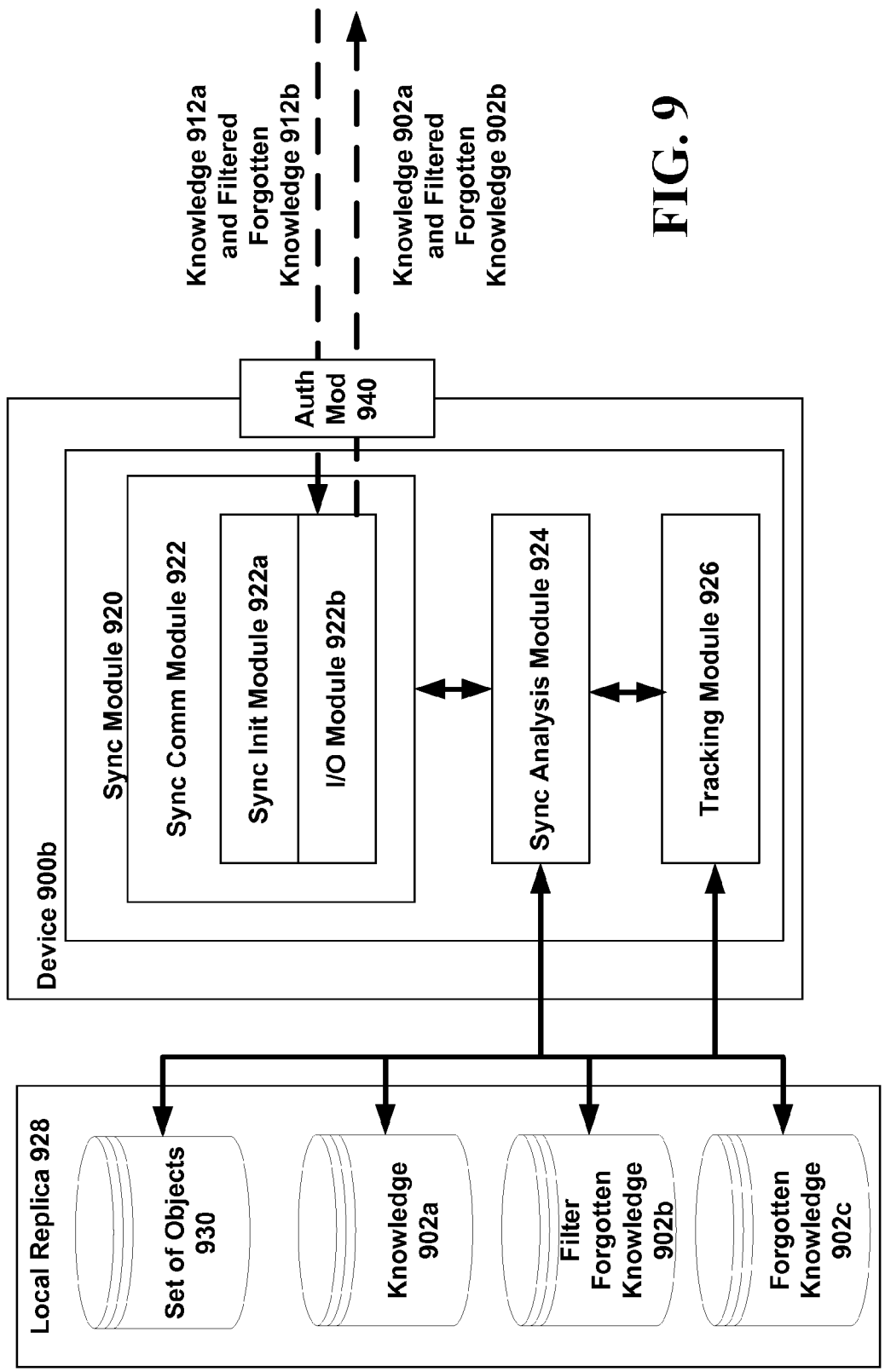
FIG. 9 is a block diagram of an exemplary non-limiting implementation of a device for performing a knowledge exchange in an embodiment.

FIG. 9 is a block diagram of an exemplary non-limiting implementation of a device 900b for performing a full or partial knowledge exchange in an embodiment, where the device tracks a filter, either by virtue of maintaining only a filtered subset of data stored by the community (e.g., a filtered replica) or by virtue of maintaining the full set of data stored by the community (e.g., a full replica), yet tracking common filters employed by the community. Thus, since device 900b tracks a filter, the device can also possess filter forgotten knowledge. As shown, device 900b includes a sync module 920 that performs the full or partial knowledge exchange and filter forgotten knowledge exchange techniques for synchronizing a set of data objects 930 with another device and/or replica in an embodiment. Sync module 920 may include a sync communications module 922 for generally transmitting and receiving data in accordance with the various knowledge exchange techniques described herein.

Sync module 920 may also include a sync initiation module 922a which may initiate synchronization with a second device if authorized, e.g., via authorization module 940, and connect to the second device. Sync module 920 may also include an I/O module 922b responsive to the initiation of synchronization by sending full and/or partial knowledge 902a and filter forgotten knowledge 902b about the set of data objects 930 to the second device (not shown), and for receiving back full and/or partial knowledge 912a and, if any, filter forgotten knowledge 912b of the second device and changes to be made to the set of data objects 930 originating from the second device. In turn, a sync analysis module 924 operates to apply the changes to be made to the set of data objects 930 and to compare full and/or partial knowledge 912a and filter forgotten knowledge 912b from the second device with the full and/or partial knowledge 902a and filter forgotten knowledge 902b of the first device in order to determine changes to send to the second device to complete synchronization between the devices.

In accordance therewith, in one or more embodiment, device 900b can include sync module 920 that can be communicatively coupled to a local replica 928 that can store a local version of a set of data objects 930 and associated metadata such as knowledge 902a, filter forgotten knowledge 902b, or forgotten knowledge 902c. As will be described in more detail below, knowledge 902a typically relates to what local replica 928 (and by proxy sync module 920 or device 900b) knows about the various states or versions associated with a set of data objects as maintained by other devices in the community, such as the second device discussed above. For example, if device 900b very recently synced with the second device, then knowledge about the second device's set of objects can be quite up-to-date and/or substantially similar to set of data objects 930 maintained by local replica 928. On the other hand, if device 900b has not synchronized with the second device in some time, then it is more likely that knowledge 902a relating to second device's replica state will be stale or outdated. Additionally, forgotten knowledge 902c typically relates to metadata information associated with set of data objects 930 that has been deleted or purged, typically because of a cleanup operation or the like. Likewise, filter forgotten knowledge 902b is similar to forgotten knowledge 902c, but can apply expressly to a filtered subset of set of data objects 930, or when local replica 928 only stores a subset of the objects maintained by the community (e.g., is a filtered replica such as including only 5 star music or including only customers residing in the State of Washington).

Further, as introduced above, sync module 920 can include a communications module 922 (e.g., sync comm. Module 922) that can be configured to communicate with at least one other sync module (e.g., associated with the second device) included in a multi-master community of sync modules. Advantageously, the community can be multi-master in the sense that any node or device included in the community can engage in a full or partial sync with any other node or device and/or receive complete knowledge exchanges necessary to maintain set of data objects 930 in a community-wide current state without the necessity of sync with a predefined master node or device.

In addition, as briefly discussed above, sync module 920 can also include an analysis module 924 (e.g., sync analysis module 924) that can be stored in a computer readable storage medium and can be configured to manage information associated with set of data objects 930. As such, the information will typically be metadata associated with set of data objects 930, including, e.g., (1) knowledge 902a pertaining to at least one version of set of data objects 930 received from the at least one other sync module, (2) forgotten knowledge 902c pertaining to deleted data objects or versions thereof of set of data objects 930, or (3) filter forgotten knowledge 902b pertaining to deleted data objects, or versions thereof, that belong to a filtered subset of the set of data objects 930 in which membership is dynamic. Thus, advantageously, synchronization mechanisms or procedures described herein can remain scalable, even without a need to fix set membership. Such is quite practical for both of the scenarios introduced above. For example, it is likely that over time, e.g., music rated 5 stars will change, either by the introduction of new 5 star music or deleting or rerating a previous 5 star rating. As another example, in the ERP situation, it is likely that, over time, some customers residing in the State of Washington will move to other states, thereby dropping out of the filter that is interested in the item of State of residence=WA.

Regardless, sync module 920 can be configured to synchronize, either partially or fully, local replica 928 based upon information received from the at least one other sync module, as substantially described herein. Such can be accomplished whether sync module 920 is the source or destination of the sync operation. For example, in one or more embodiment where sync module 920 is a source node, sync module 920 can be configured to initiate a synchronization procedure with the at least one other sync module by way of a change request (e.g., request changes 800 of FIG. 8), which can transmit to the information (e.g., knowledge 902a, filter forgotten knowledge 902b, and/or forgotten knowledge 902c) to the at least one other sync module. As a result, sync module 920 can receive from the at least one other sync module a conveyance of any changes (e.g., change convey 810 of FIG. 8), which can include all or a subset of knowledge, filter forgotten knowledge, or forgotten knowledge associated with the at least one other sync module.

In the case where sync module 920 is a destination node, in one or more embodiment thereof, sync module 920 can be configured to respond to a synchronization procedure requested by the at least one other sync module based upon receipt of a change request that includes, e.g., knowledge, forgotten knowledge, or filter forgotten knowledge associated with the at least one other sync module. In addition, sync module 920 can also be configured to perform a comparison between data included in the change request and data included in the local replica 928. Further still, sync module 920 can be configured to transmit data determined to be unknown to the at least one other sync module based upon the comparison by way of a change conveyance.

Advantageously, when making the aforementioned comparison, in one or more embodiment, sync module 920 can be configured to compare received knowledge from the at least one other sync module to one or both of forgotten knowledge or filter forgotten knowledge included in local replica 928. In the case where the received knowledge is contained in the forgotten knowledge (or filter forgotten knowledge), then a normal sync can be performed as noted above, in which data determined to be unknown to the at least one other sync module can be transmitted. Additionally or alternatively, in the case where the received knowledge is not contained in the forgotten knowledge or filter forgotten knowledge of the at least one other sync module, then sync module 920 can proceed with one of a partial sync with line item exceptions or a full enumeration sync.

In one or more embodiment, sync module 920 can further include tracking module 926. Tracking module 926 can be configured to monitor or track at least one filter applied to the set of data objects 930. In other words, tracking module 926 can monitor various objects included in the set of data objects 930 that belong to a particular filter. That is, for example, music with a 5 star rating or customers who reside in WA can be monitored, e.g., to determine if and/or when such objects move out of the filter. Accordingly, music with a 5 star rating that is later set to 4 stars (or a customer who moves from WA to, say NY) will move out of the filter, but, at least for a certain period of time (e.g., to ensure other nodes can be apprised of the change), can still be tracked by tracking module 926. On the other hand, music that has never been rated with 5 stars or at least not within a recent time frame (e.g., since a most recent cleanup operation and/or a typical period in which other nodes are likely to be informed of the out move), will not be tracked by the "5 star" filter, but can be monitored by tracking module 920 in accordance with one or more different filter, such as, for instance, music under a certain price or music for relaxation, and so forth.

In one or more embodiment, tracking module 926 can be further configured to maintain a data table related to filtered data objects included in set of data objects 930, such as Table I, provided below. Table I, which follows, is an example of how a replica can advantageously track a filter for an item without change units.

TABLE I

| Item Id | Creation Version | Last Update Version | Has been in the filter | Move out version |
|---|---|---|---|---|
| Id1 | A10 | B15 | TRUE | |
| Id2 | A5 | B9 | FALSE | null |
| Id3 | A9 | A9 | TRUE | A9 |

Thus, for example, the data table maintained by tracking module 926 can include at least one of (1) an item ID that uniquely describes a filtered data object; (2) a creation version that denotes a sync module ID and an indication of time associated with creation of the filtered data object; (3) a last update version that relates to a sync module ID and an indication of time associated with update to or versioning of the filtered data object; (4) an indication of presence or recent presence (e.g., "Has been in the filter") of the filtered data object in the at least one filter; or (5) a move out version that relates to either a sync module ID and an indication of time associated with a change to the filtered data object that removes the filtered data object from the at least one filter or a null value or another value that indicates the filtered data object has not ever, or not recently, been in the at least one filter.

In accordance therewith, in one or more embodiment, tracking module 926 can be further configured to bootstrap the at least one filter in order to track preexisting filters. Thus, filters created by other nodes that are newly learned after the filter has previously existed, or in the case of a particular node that newly begins tracking a filter that previously existed need not lead to synchronization issues. Rather, the filter can be bootstrapped by setting filter forgotten knowledge associated with the data objects included in the filter to knowledge associated with the data objects included in the filter.

In addition, in one or more embodiment, tracking module 926 can be further configured to set filter forgotten knowledge of a moved data object to the move out version of the moved data object in order to treat the moved data object as though the moved data object never existed in the at least one filter. Such can be advantageous in that additional data such as ghosts or tombstones need no longer be stored in or associated with the filter forgotten knowledge, as further detailed herein.

Therefore, tracking module 926 can be configured to set filter forgotten knowledge 902b to the move out version during or substantially concurrently with a cleanup operation, in which case, filter forgotten knowledge and forgotten knowledge can be substantially identical.

It should be understood that with respect to all or a portion of the features detailed herein, sync module 920 can be associated with local replica 928 that is either one of a full replica (e.g., intended to store a copy of all data for the community) or a filtered replica (e.g., intended to store a subset of all data for the community, as determined by one or more filter), which can be syncing with either another full or filtered replica. However, it should be apparent that more interesting cases and/or more interesting uses associated with filter forgotten knowledge 902b arise during synch operations involving a full replica and a filtered replica, or with two filtered replicas that track the same or overlapping filters.

Therefore, in one or more embodiments, local replica 928 is a full replica configured to maintain all data managed by the multi-master community and a remote replica associated with the at least one other sync module is a filtered replica configured to maintain a subset of the data managed by the multi-master community based upon at least one filter applied to the set of data objects 930. In one or more embodiments, local replica 928 is a filtered replica configured to maintain a subset of data managed by the multi-master community based upon at least one filter applied to the set of data objects 930 and a remote replica associated with the at least one other sync module is a full replica configured to maintain all data managed by the multi-master community The various embodiments for efficiently representing knowledge may also be applied to the context of resolving in memory data on the same provider. In such context, the in memory data may not be backed by a physical store, e.g., it might be used in a graph solver on the CPU to synchronize nodes. The various embodiments may also be applied in the context of scene graphs, especially as they become more distributed on multi-core architectures and calculations are written directly to an in memory data structure such as a volumetric texture.

Efficient Synchronization with Filters

As mentioned, filtering is applicable to many synchronization scenarios. In various embodiments, a comprehensive filtering functionality is built into a synchronization framework. As described for one or more of the embodiments, the synchronization framework can support list based filters. With a list based filter, the filter is defined in terms of the list of items, e.g., their global ids or GUIDs, which are in the filter. With list based filters, the metadata, which is exchanged during synchronization and saved as knowledge, grows linearly with the number of items which can become cumbersome for a large number of items or limited bandwidth for exchange.

The synchronization framework can also support column filtering. Column filters are expressed in terms of change units, e.g., properties of items, which are part of the filter. Column filters can also be called vertical filters.

In various other embodiments described herein, the filtering support of a synchronization framework can be extended to include other types of filters. This includes custom filters and move filters. A custom filter is one where the filter is defined by a third party and not understood by the synchronization framework. A move filter is one where the filter membership, e.g., a set of items that belong to the filter, changes over time.

In this regard, such filtering includes support for custom filters, e.g., filter(s) defined and implemented by third party code. The filtering is efficient since metadata growth is not proportional to the number of items in the filter. Further, filter usage is not a burden on the synchronization community since filter(s) used in one replica do not have to be understood, and maintained by all other replicas in the synchronization community. In addition, the synchronization protocol supports various common filtered replica synchronization scenarios for ease of use. Other scenarios by the synchronization framework are supported as well with single item exceptions in knowledge.

Media devices can use filters in terms of media type and attributes. Here are some examples: (a) Include a specific album, e.g., include all tracks that are part of the album, (b) Filter of specific tracks, (c) Filter of specific artist(s), (d) Include a folder of photos, (e) Include a play list, e.g., include all tracks on the play list, (f) Include a podcast series, e.g., depending on setting includes a number of episodes, (g) Genre Rock filter, e.g., includes all tracks of Genre Rock and (h) Filter of music that I do not hate, e.g., an exclude based list.

The following terms are used herein, and are defined as follows: Ghosting, Forgetting, Knowing filter F, Tracking filter F, Filtered Replica, Filtered Change Batch and Filter Forgotten Knowledge.

Ghosting is a technique by which a replica removes the data of an item or change unit, and keeps the metadata, namely the ID and change version. Ghosting is a way for a replica to manage its storage requirements by removing data that is of no interest to the replica.

Forgetting is a technique where a replica removes both data, and metadata for an item. Forgetting may be desired when, due to the storage limitations on a replica, keeping ghosts for many items is not desirable.

With respect to Knowing filter F, a replica with knowledge K knows filter F since $K_F$ iff (e.g., if and only if) the replica has versions for all items that had been in F since $K_F$.

With respect to Tracking filter F, a replica with knowledge K tracks filter F since $K_F$ iff the replica has versions for all items that have been in F since $K_F$, and the replica knows which items had been in F.

A filtered replica is a replica that stores data that belongs to a filter (e.g., only stores data that belongs to the filter). Filtered replicas keep ghosts for items that had been in the filter recently, and have moved out.

A filtered replica for filter F and forgotten knowledge (FK) is by definition tracking F since FK iff the replica maintains ghosts for all items that had been in F since FK.

A filtered change batch for filter F, pre-requisite knowledge (PK), and made with knowledge (MWK) has all changes (I, v) such that PK does not contain (I, V) and I had been in F.

A filtered change batch has data for all items in the filter and has versions for all items that had been in F.

A filtered change batch can have versions for more items, including items that may not have been in the filter. This allows replicas that know F, and do not track F, to produce filtered change batch.

Filter forgotten knowledge for a filter represents what is the base knowledge, e.g., most recent point, from which a replica has tracking information for a filter.

Filter forgotten knowledge helps a replica with tracking a filter in the following ways: (1) A replica can start to track a filter after the replica has existed for awhile without tracking the filter. The replica does so by setting its current knowledge at the time of starting to track the filter as the filter forgotten knowledge and (2) When an item that has been outside a filter F for a long time, a replica can treat the item as if the item has not been in the filter. The replica does so by advancing its filter forgotten knowledge to contain the move out version of the item.

With respect to tracking and ghosts, having all full replicas track a filter is one model. In this regard, full replicas track filters for filters with which they do filtered change enumeration. Filtered replicas maintain ghosts for items that have been in the filter. This is good from the standpoint of storage requirements since the replicas do not have to maintain ghosts for items that had not been in the filter.

In another model, not all full replicas track the filter. When a replica that does not track filter F sends changes to a replica that tracks F, the destination replica does not know which of the changed items have been in F. Items that are known to destination to have been in F are understood, but for other items, if changes are received, the destination advances its filter forgotten knowledge to current knowledge.

Later, when the filter tracking replica does a filtered change enumeration, the filter forgotten knowledge violation causes replica to send versions for those items for which filter forgotten knowledge has been advanced. This leads to correct synchronization in terms of convergence, and correct knowledge.

Both full replicas and filtered replicas can maintain full (or "unfiltered") knowledge.

Knowledge of a filtered replica with filter F remains free of single item exceptions as far as the replica is synchronizing with replicas that track F.

Knowledge of a full replica has single item exceptions when the replica receives changes made at a full replica from the filtered replica. Such exceptions go away when the full replica synchronizes with other full replicas directly.

When a full replica does an occasional filtered synchronization with another full replica, the replica ends up with single item exceptions.

With respect to forgotten knowledge and filter forgotten knowledge, full replicas maintain a separate filter forgotten knowledge if they do not track the filter from the beginning. A filter forgotten knowledge that is different than forgotten knowledge is maintained from the time the replica started to track the filter until the next tombstone cleanup.

Filtered replicas maintain the filter forgotten knowledge. Filtered replicas also maintain a separate forgotten knowledge since they store ghosts for items that have been in the filter.

In one aspect of an embodiment of a synchronization protocol, tracked filters that are common between source and destination are identified. During synchronization filter tracking, information is synchronized for any filters that are tracked both at the source and destination. In order to determine the common filters, the destination sends the list of filters the destination is tracking to the source. This can be done using filter negotiation or a similar mechanism.

In one non-limiting implementation, filter tracking providers implement IFilterTrackingProvider. The synchronization session calls IFilterTrackingProvider.SpecifyTrackedFilters on the destination provider, and for each filter specified by the destination provider IFilterTrackingProvider.AddTrackedFilter is called on the source provider.

For a change batch, the source provider adds the filter forgotten knowledge for the subset of filters that are tracked both at the source and destination.

Destination unions source filter forgotten knowledge to its filter forgotten knowledge for any changes for which it is learning knowledge.

In one embodiment, for a synchronization change, the following filter change information is added to synchronization change: (1) If the item has been in the filter, e.g., a boolean value, and (2) the move out version, e.g., if an item has been in the filter, but has moved out, then the change version that moved the item out of the filter is the move out version.

When request (e.g., destination) knowledge does not contain the filter forgotten knowledge for an item, the source can assume the item to be one that has been in the filter and send any versions that are not contained by the request knowledge.

In one embodiment, when change units are involved, the source provider can use ContainsChangeUnit against all change unit(s) changes that can cause the item to move out. When it is not clear which change unit changes can cause an item to move item, a provider can use the change units that are relevant during synchronization, e.g., all of them, or if column filtering is involved, all of them that are part of the filter.

The destination provider can save the move out version when the destination provider is saving a change that causes an item to move out. It is ok for it to save a move out change even, e.g., in the presence of conflicts or recoverable errors.

In various embodiments and for various synchronization scenarios, the following knowledge operations enabled by the synchronization framework are provided for applications: complement, intersects, AddAllChangeUnitsRequiredMarker, AddAllChangeUnitsPresentMarker, ContainsAllChangeUnitsRequiredMarker and RemoveMarkers, as follows.

For Complement, in one embodiment, K1.Complement (K2) returns a knowledge that contains the changes that are contained by K1, but not contained by K2. For Intersects, in one embodiment, Intersects returns S_OK or S_FALSE based on whether the two knowledges have any clock vectors with common replica id.

For AddAllChangeUnitsRequiredMarker, in one embodiment, the destination provider uses this application programming interface (API) to add a marker that requests the source provider to include the change units, e.g., all change units, when enumerating items. The source provider can still apply any filters that the source provider has been asked to apply.

For AddAllChangeUnitsPresentMarker, in one embodiment, change batch uses this API to add a marker in learned knowledge that would indicate a change with the change units, e.g., all change units, was included in the change batch.

For ContainsAllChangeUnitsRequiredMarker, in one embodiment, when doing change enumeration, if a change unit that is not obsolete is found, the source provider can use this API to decide if the source provider will include the change units, e.g., all change units, that are applicable or not.

For RemoveMarkers, in one embodiment, a change batch builder uses this API to remove any "all change units required" or "all change units present" markers from the made with knowledge or pre-requisite knowledge.

It is noted that an implementation of ContainsChange or ContainsKnowledge can ignore the markers. Union can remove matching "all change units required" and "all change units present" markers.

For full replicas doing filtered change enumeration, with known filters, full replicas keep data and metadata for the items, e.g., all items. Hence, by definition the full replicas "know" the filters, e.g., all filters. For example, the full replicas can ignore the requested filter and produce an unfiltered change batch.

For full replicas doing filtered change enumeration, with tracked filters, a full replica can track filters with which the full replica is frequently asked to enumerate changes. In one embodiment, tracking a filter uses a replica to keep the following per item metadata: (1) HasBeenInTheFilter (BOOL)—indicates that item had been in the filter recently, (2) MoveOutVersion (SyncVersion)—the move out version of the item. In this regard, null indicates an item had never been in the filter.

As provided above, with respect to Table I, a replica can track a filter for an item without employing change units.

With respect to bootstrapping a filter, a full replica can start to track a filter after the full replica has existed for awhile without having tracked the filter. The full replica does this by setting its current knowledge at the time of tracking the filter as the filter forgotten knowledge.

With respect to items that have been outside the filter for a long period, a replica can treat an item that has been outside the filter for a long time as one that has not been in the filter, but when doing so, the replica advances its filter forgotten knowledge to include the move out version of such items. One time for the provider to do this is at the same time the provider is performing tombstone cleanup. In one non-limiting implementation, the provider can do the following: (1) Set the filter forgotten knowledge to forgotten knowledge and (2) Set "Has been in the filter" to FALSE for all items whose move out version is contained by the forgotten knowledge.

With respect to a filtered change batch, in one embodiment, a filtered change batch includes the following: (1) Made with knowledge—source knowledge, (2) Pre-requisite knowledge—request knowledge, (3) Forgotten knowledge—filter forgotten knowledge and (4) Changes including (a) Data—for the items in the filter at the source (e.g., all items) and (b) Metadata—for the items that have been in the filter, e.g., has been in the filter=TRUE.

With respect to a filtered replica doing filtered change enumeration, for known filters, a filtered replica stores data for all items that belong to a filter. It maintains metadata (versions) for all items that had been in the filter recently. Hence by definition a filtered replica knows the filter that is part of its replica definition.

For tracked filters, a filtered replica maintains ghosts for all items that have been in the filter. Such a filtered replica tracks the filter by definition.

When cleaning up ghosts, a filtered replica can clean up ghosts just like a full replica cleans up tombstones. It does so by removing ghosts and advancing its forgotten knowledge to include the move out version for all the ghosts that were removed.

For a filtered change batch, the following is included: (1) Made with knowledge—source knowledge, (2) Pre-requisite knowledge—request knowledge, (3) Forgotten knowledge—filter forgotten knowledge and (4) Changes including (a) Data—for the items, e.g., all items, in the filter at the source and (b) Metadata—the ghosts, e.g., all the ghosts.

With respect to a filtered replica doing change enumeration without a filter, in one embodiment, a filtered change batch includes the following: (1) Made with knowledge—source knowledge, (2) Pre-requisite knowledge—request knowledge, (3) Forgotten knowledge—forgotten knowledge and (4) Changes including (a) Data—for the items, e.g., all items, in the filter at the source and (b) Metadata—the ghosts, e.g., all the ghosts.

With respect to a filtered replica doing change application of filtered change batch, the following notations can be used for descriptive simplicity: DFK—destination forgotten knowledge, DFFK—destination filter forgotten knowledge, SFK—source forgotten knowledge, DK—destination knowledge, Complement—Knowledge subtraction and Intersection—Knowledge intersection.

For conflict detection, the following non-limiting implementation details are provided as an example. In addition to regular knowledge conflict checks, the following can be performed:

```
public DetectConflicts( )
{
  if (destinationVersion != null)
  {
    //
    // Destination has item and not ghost
    //
    if (destinationHasItem)
    {
      //
      // Can do regular conflict detection
      //
      destinationKnowledge += change.LearnKnowledge( );
    }
    //
    // Can unghost. Whole item present?
    //
    else if (fullItemEnumerated)
    {
      //
      // A new change made with the versions of the destination
      //
      if (MWK.Contains(destinationVersion))
      {
        //
        // Unghost item and learn knowledge
        //
        destinationKnowledge += change.LearnKnowledge( );
      }
      else
      {
        //
        // Raise conflict and accept with new version
        //
      }
    }
    //
    // Unghost, but only a partial change enumerated
    //
    else
    {
      //
      // Add a marker to destination knowledge which
      // requests next time changes are enumerated to this
      // provider, the relevant change units are included
      //
      destKnowledge.AddAllChangeUnitsRequiredMarker(change.itemId);
    }
  }
  //
  // Destination knows the creation version, but item or ghost does not
  // exist.
  //
  //
  else if (destinationKnowledge.Contains(change.CreationVersion))
  {
    if (fullItemEnumerated)
    {
      //
      // Item has moved into the filter
      //
      if (MWK.Contains(destinationKnowledge.ProjectToChange( )))
      {
        //
        // Create item and accept knowledge
        //
        destinationKnowledge += change.LearnKnowledge( );
      }
      //
      // Item has moved into the filter, but destination knowledge
      // is higher. Possibly get some changes that were discarded
      //
      else if ( MWK.Contains(
        destFilterForgottenKnowledge.ProjectToChange( )))
      {
```

```
        //
        // Lower knowledge and accept change
        //
        // calculation
        //
      }
      //
      // The ability to correctly detect conflicts
      // for this change may have been lost
      //
      else
      {
        //
        // Raise new type of conflict (e.g., possibly overwrite some
        // change) accept with new version
        //
      }
    }
    else
    {
      destKnowledge.AddAllChangeUnitsRequiredMarker(change.itemId);
    }
  }
  //
  // Can apply this change. It is a new create
  //
  else
  {
    destinationKnowledge += change.LearnKnowledge( );
  }
}
```

Knowledge can be calculated as follows:

```
DK=DK+MWK.ProjectWithPrerequisite( ).Exclude
    (all items that have a filter move in version not
    contained by MWK)
```

With respect to forgotten knowledge, a filtered replica's forgotten knowledge is advanced to cover items and ranges for which the filtered replica's learned knowledge is advanced. With respect to filter forgotten knowledge, filter forgotten knowledge is advanced to cover any items and ranges for which the learned knowledge is advanced. This is true both for filtered replicas, as well as for full replicas that track a filter.

For a full replica doing change application on receiving changes from a filtered replica, when a destination is a full replica, the change batch is unfiltered. In such case, the change batch will have the following: (1) Made with knowledge—source knowledge, (2) Pre-requisite knowledge—request knowledge, (3) Forgotten knowledge—forgotten knowledge and (4) Changes including (a) Data—for items, e.g., all items, in the filter at the source and (b) Metadata—the ghosts, e.g., all the ghosts.

It is noted that if the source is keeping ghosts only for items that had been in the filter, the source forgotten knowledge will be high.

The following topology is used for the examples that follow below.
A—Full replica
B—Full replica
C—Filtered replica with F1
D—Filtered replica with F1
E—Filtered replica with F2, where neither F1 or F2 contains the other, but they overlap The following notations are also used:
$K_A$=A's knowledge
$FK_A$=A's forgotten knowledge
$FK_A(F1)$=A's filter forgotten knowledge for F1

With respect to bootstrapping tracking of a filter, the following example is illustrative.

1. Initial state:
   a. $K_A$=A10B5, $FK_A$=null
   b. $K_C$=C20, $FK_C$=null, $FK_C(F1)$=null
2. A starts to track F1. $FK_A(F1)$=A10B5.
3. A→C synchronization change batch has
   a. MWK=A10B5
   b. PK=C20
   c. FK=null
   d. Although $K_C$.Contains($FK_A(F1)$)==FALSE, it is also $K_C$.Intersects($FK_A(F1)$)==FALSE. Hence, A includes items that have been in the filter since A10B5.
4. A→C synchronization change application @ C
   a. Advance forgotten knowledge since C is a filtered replica: $FK_C$=A10B5
   b. Advance filter forgotten knowledge $FK_C(F1)$=A10B5
   c. Advance knowledge: $K_C$=A10B5C20

With respect to bootstrapping tracking of a filter with some common changes, the following is a continuation of the above example.

1. Initial state:
   a. $K_B$=A5B15, $FK_B$=null
   b. $K_C$=A10B5C20, $FK_C$=A10B5, $FK_C(F1)$=A10B5
2. B starts to track F1. $FK_B(F1)$=A5B15.
3. B→C synchronization change batch has
   a. MWK=A5B15
   b. PK=A10B5C20
   c. FK=null
   d. B includes ghosts for all changes since $K_C$.Contains($FK_B(F1)$)==FALSE && $K_C$.Intersects($FK_B(F1)$)==TRUE
4. B→C synchronization change application @ C
   a. Advance knowledge to $K_C$=A10B15C20
   b. Advance forgotten knowledge $FK_C$=A10B15
   c. Advance filter forgotten knowledge $FK_C(F1)$=A10B5

With respect to synchronization from a full replica to a filtered replica, in this example, synchronization occurs where the full replica has been tracking the filter for awhile, as follows.

1. Initial state
   a. $K_A$=A30B20C40D10, $FK_A$=$FK_A(F1)$=A15B8C5D2
   b. $K_C$=A20B30C50D8, $FK_C$=A20B30, $FK_C(F1)$=A5B15
2. A→C synchronization, change batch has
   a. MWK=A30B20C40D10
   b. PK=A20B30C50D8
   c. FK=A15B8C5D2
3. A→C synchronization change application @ C
   a. Forgotten knowledge check succeeds: $K_C$.Contains(FK)==TRUE.
   b. Advance forgotten knowledge since C is a filtered replica. $FK_C$=$FK_C$+MWK.Complement($K_C$)=A30B30D10
   c. Advance knowledge: $K_C$=A30B30C50D10
   d. Filter forgotten knowledge does not change. $FK_C(F1)$=$FK_C(F1)$.Union($FK_A(F1)$.Complement($K_C$)

With respect to synchronization from a filtered replica to another with the same filter, the following example is illustrative:

1. Initial state
   a. $K_C$=A15B20C8D5, $FK_C$=A15B20, $FK_C(F1)$=A5B15
   b. $K_D$=A10B25C2D10, $FK_D$=A10B25, $FK_C(F1)$=A5B15
2. C→D synchronization; Change batch has
   a. MWK=A15B20C8D5
   b. PK=A10B25C2D10
   c. FK=A5B15
3. C→D synchronization; Change application @ D
   a. Forgotten knowledge check passes.
   b. Advance forgotten knowledge since D is a filtered replica $FK_D$=A15B25D10
   c. Advance knowledge: $K_D$=A15B25C8D10

With respect to synchronization from a filtered replica to a full replica the following example is illustrative:

1. Initial state:
   a. $K_B$=A20B35C30D10, $FK_B$=$FK_B$(F1)=A5B15
   b. $K_C$=A30B25C40D12, $FK_C$=A30B25, $FK_C$(F1)=A5B15
2. C→B synchronization; Change batch has
   a. MWK=A30B25C40D12
   b. PK=A20B35C30D10
   c. FK=A30B25
3. C→B synchronization; Change application @ B
   a. Forgotten knowledge check fails: $K_B$.Contains(FK)==FALSE
   b. Partial synchronization happens (recovery synchronization not possible)
   $K_B$=$K_B$+MWK.UnionWithPrerequisite(PK.Union(FK), $K_C$)+MWK.Project(changesAppplied)=A20B35C40D12+ single item exceptions for all changes with A30

With respect to synchronization from a filtered replica to another with a different filter, the following example is illustrative:

1. Initial state
   a. $K_C$=A10C15, $FK_C$=A10, $FK_C$(F1)=null, $FK_C$(F2)=A10C15
   b. $K_E$=A8E20
2. C→E synchronization; Change batch has
   a. MWK=A10C15
   b. PK=A8E20
   c. FK=A10C15
3. C→E; Change application @ E
   a. Forgotten knowledge check fails
   b. Do partial synchronization. Advance knowledge with single item exceptions. $K_E$=A8E20+{for all applied changes}A10C15

To support filtered synchronization for a synchronization application, the synchronization application can pass the filter to the destination provider, unless the destination is a filtered replica that does not know it is filtered. In such case, a variety of interfaces defined by synchronization framework can be used for the synchronization application to pass the desired filter to the destination provider.

With respect to filter tracking providers, a provider is said to be tracking a filter if, for every item and tombstone, the provider knows/tracks: (1) Which items have recently been in the filter, (2) When did the last move (in or out) happen for items that have recently been in the filter and (3) A filter forgotten knowledge which represents knowledge that is an over estimation (guaranteed to be no smaller) on from what point provider can correctly enumerate filter changes.

A filter tracking provider implements IFilterTrackingProvider and ISupportFilteredSync. Filter tracking providers that uses change applier also implement IFilterTrackingNotifyingChangeApplierTarget.

One way to filter forgotten knowledge is to calculate the forgotten knowledge by taking a snapshot of the replica knowledge when a filter was tracked initially, and then updating the snapshot during the following cases: 1) When synchronizing changes from other replicas. When using change applier this happens automatically, 2) When tombstones are cleaned up and 3) When filter change information is cleaned up. A replica can treat items that have been outside of the filter for a long time to have never been in the filter, but when it does that, it can update its filter forgotten knowledge. ForgetToVersion can also be used to update the forgotten knowledge instead of using the snapshot mechanism.

Providers are recommended to clean up filter change information at the same time as tombstone cleanup. In which case, once a cleanup has happened, forgotten knowledge and filter forgotten knowledge are the same and storing them separately is unnecessary.

With respect to filter tracking negotiation, a filter tracking provider participates in filter tracking negotiation using methods on IFilterTrackingProvider. When two full replicas that track filters synchronize, the filter tracking information is synchronized. Filter tracking happens after BeginSession and prior to any other methods (e.g., GetSyncBatchParameters, GetChangeBatch, or ProcessChangeBatch) called on the provider.

When a filter tracking provider is the destination of a synchronization operation, the provider specifies the filters using IFilterTrackingProvider.SpecifyTrackedFilters. If one or more filters are not tracked by the source (e.g., the return value is S_FALSE or SYNC_E_FILTER_NOT_SUPPORTED), it is ok and synchronization can continue.

When a filter tracking provider is the source of the synchronization operation, in one non-limiting implementation, IFilterTrackingProvider.AddTrackedFilter is called for each filter tracked by the destination. If the destination does not track a filter, the destination indicates the filter is not tracked by returning S_FALSE. HRESULTs other than S_FALSE and SYNC_E_FILTER_NOT_SUPPORTED will abort the synchronization session.

With respect to change enumeration, GetChangeBatch is called on the provider to get changes. The provider determines whether the destination is tracking any filters based on the filter negotiation that happened.

In one non-limiting implementation, if ISupportFilteredSync.AddFilter is called, then destination has requested a filter. If filtering type is FT_CURRENT_ITEMS_AND_VERSIONS_FOR_MOVED_OUT_ITEMS, then destination is a filtered replica. If IFilterTrackingProvider.AddTrackedFilter is called, then the destination is tracking some filters. The destination may or may not be a filtered replica.

If a filter is requested, then a filtered change batch is produced. Otherwise, a regular change batch is produced. If the destination has requested a custom filter, or requested filter tracking information for a custom filter, then a filter key map can be specified using—ISyncChangeBatchWithFilterKeyMap.SetFilterKeyMap. This can be performed before any groups (ordered or unordered) are added, and before any changes or logged conflicts are added to the change batch.

In one non-limiting embodiment, for every filter that is common between source and destination, filter forgotten knowledge is specified and filter changes are added to the synchronization change if the destination does not know the filter. When creating a change batch with custom or a combined filter, the filter forgotten knowledge is specified as the forgotten knowledge.

Filter forgotten knowledge can be added to the change batch using ISyncChangeBatchWithFilterKeyMap.SetFilterForgottenKnowledge. This can be done once per group, after the group has been started. This is since different groups can have different filter forgotten knowledges.

When change units are involved and source knowledge contains the "all change units required" marker, e.g., IKnowledgeWithMarkers→ContainsAllChangeUnitsRequiredMarker(itemId), and at least one non-obsolete change unit is found, the source can include the change units that are relevant, e.g., if no column filtering involved then all change units at source, else all change units in the column filter. When the source includes the change units, then in one embodiment, the source can set the "all change units present" marker on the synchronization change using IFilterTrackingSyncChangeBuilder. SetAllChangeUnitsPresentFlag( ).

When there are common custom filters between the source and destination filter, in one embodiment, changes that are not obsolete can be added to the synchronization change using IFilterTrackingSyncChangeBuilder. AddFilterChange.Filter changes are conceptually present in a special change unit and hence ContainsChange (instead of ConstainsChangeUnit) can be used to determine if the change is obsolete or not.

A source provider can decide whether to enumerate filter changes based on checks of the move version of filter changes against destination knowledge. There can be the following cases for the custom filters and filter changes: (1) There are no change units associated with a filter. Filter membership is done based on evaluating a whole item. In this case, the filter change is enumerated if destination knowledge does not contain a move version for the current item. (2) A single change unit is associated with a filter. In this case, the filter change is enumerated if destination knowledge does not contain a move version for the change unit used in the filter for the current item. (3) More than one change unit is associated with a filter. In this case, the filter change is enumerated if destination knowledge does not contain a move version for all change units used in the filter for the current item.

For a change application, in one embodiment, ProcessChangeBatch is called on the provider to apply changes. In one implementation, providers that use change application calls ApplyChanges with an ISynchronousNotifyingChangeApplier that is also an IFilterTrackingNotifyingChangeApplierTarget.

When destination versions are given to the change applier, destination filter changes can be included. In one embodiment, destination filter changes are added using IFilterTrackingSyncChangeBuilder.AddFilterChange. When saving changes, filter changes can be updated using IFilterTrackingSaveChangeContext.GetFilterChange.

In one non-limiting implementation, the IFilterTrackingSaveChangeContext.GetFilterChange method can return: 1) S_OK if filter change is enumerated from the source and filter change is available, 2) S_FALSE if source replica is tracking but there is no filter change or 3) SYNC_E_FILTER_CHANGE_NOT_AVAILABLE if source replica is not tracking.

The responsibility of the destination provider is to carry out that a filter change returned by IFilterTrackingSaveChangeContext.GetFilterChange is not obsolete by using the following logic for the following cases: 1) If there are no change units associated with a filter, a filter change is obsolete if its move version is contained by the destination knowledge for the current item. 2) If there is a single change unit associated with a filter, a filter change is obsolete if its move version is contained by the destination knowledge for the change unit used in the filter for the current item. 3) If there are several change units associated with a filter, a filter change is obsolete if its move version is contained by the destination knowledge for all change units used in the filter for the current item.

Once a filter change is considered to be not obsolete, the destination provider typically helps to ensure there are no conflicts with the current filter change at the destination. In one non-limiting implementation, the destination provider uses the following logic: 1) If IFilterTrackingSaveChangeContext.GetFilterChange returns SYNC_E_FILTER_CHANGE_NOT_AVAILABLE, the destination can assign a new move version to the filter change. 2) If IFilterTrackingSaveChangeContext.GetFilterChange returns S_FALSE, the destination can reevaluate the filter and assign a new move version to the filter change if it changes. 3) If IFilterTrackingSaveChangeContext.GetFilterChange returns S_OK, the destination can perform a conflict detection: a) If there are no change units associated with a filter, the local filter change is conflicting if its move version is not contained in the made-with knowledge for the current change for the current item. b) If there is a single change unit associated with a filter, the local filter change is conflict if its move version is not contained in the made-with knowledge for the current change for the change unit used in the filter for the current item. c) If there are several change units associated with a filter, the local filter change is conflict if its move version is not contained in the made-with knowledge for the current change for all change units used in the filter for the current item.

Once a conflict is detected, the destination can resolve it in whatever way it deems right, e.g., by merging with the filter change enumerated from the source, and assign the new move version to the filter change. Else If move version conflict is not detected, but an inconsistency on move-in flag between source and destination filter changes is present, the destination provider re-evaluates a filter, picks a move-in flag value and assigns a new version. Else, the source's filter change and its move-in flag/move version are saved.

If a provider updates knowledge per change using GetKnowledgeForScope, the provider can update filter forgotten knowledge using IFilterTrackingSaveChangeContext.GetUpdatedFilterForgottenKnowledge.

For filter tracking, providers change applier calls (e.g., IFilterTrackingNotifyingChangeApplierTarget. SaveKnowledgeWithFilterForgottenKnowledges instead of ISynchronousNotifyingChangeApplierTarget.SaveKnowledge).

Providers that do not use a change applier can otherwise ensure filter forgotten knowledge is advanced correctly. If a source does not track a filter, source knowledge for the changes can be added to destination filter forgotten knowledge. If a source does track a filter, then source knowledge for the changes can be added if the destination filter forgotten knowledge does not contain the filter already.

In regards to filtered replica providers, filtered replicas store data for items that belong to a custom or combined filter. Filtered replicas store ghosts for items that have recently been in the filter. By definition, a filtered replica is tracking the filter that is part of its definition.

In one embodiment, a filter tracking provider implements IFilterTrackingProvider, ISupportFilteredSync, and IRequestFilteredSync. Filtered replica providers that use a change applier also implement IFilteredReplicaNotifyingChangeApplierTarget.

In regards to filter forgotten knowledge, filtered replicas add the filter that is part of their replica definition as the first filter in their filter key map. If there are other filters they track, they can be added afterwards.

With respect to change enumeration, when no filters have been negotiated, a filtered replica is enumerating changes to a full replica. If the filter that is part of the replica definition has been negotiated, then the filtered replica is enumerating changes to another filtered replica with the same filter.

When enumerating changes to another filtered replica with the same filter, filter forgotten knowledge is specified as the forgotten knowledge for change batch creation. In other cases, replicas specify their forgotten knowledge.

If the destination replica is a full replica, then ghosts can be skipped.

With respect to change application, ProcessChangeBatch is called on the provider to apply changes. Providers that use change application calls ApplyChanges with a ISynchronousNotifyingChangeApplier that is also (e.g., can be QIed to) a IFilteredReplicaChangeApplierTarget.

Guidelines that are applicable to filter tracking replicas can also be applicable here.

Figure 10:
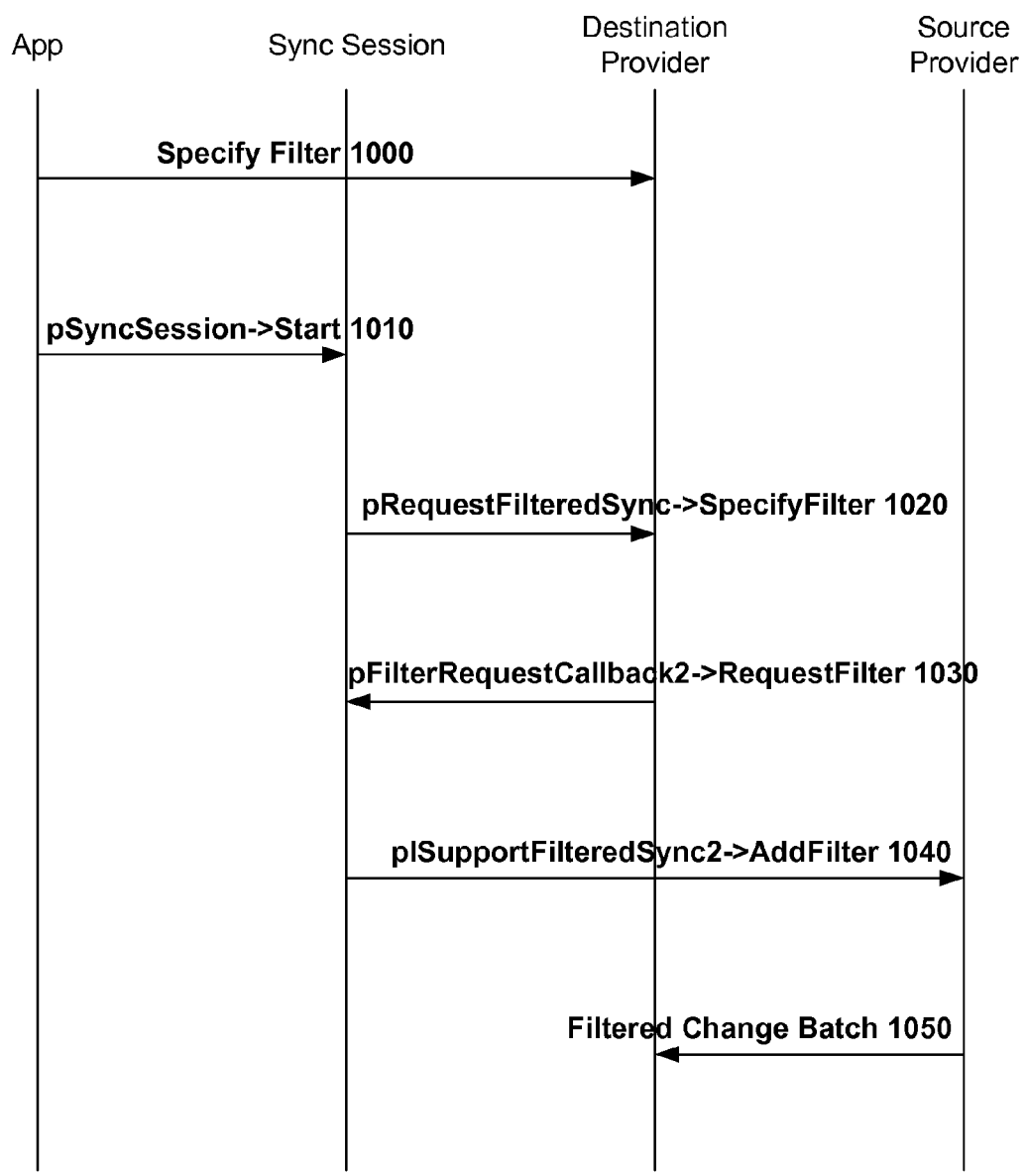
FIG. 10 is a block diagram of an component interaction for performing a knowledge exchange in an embodiment of replica tracking filters.
Figure 11:
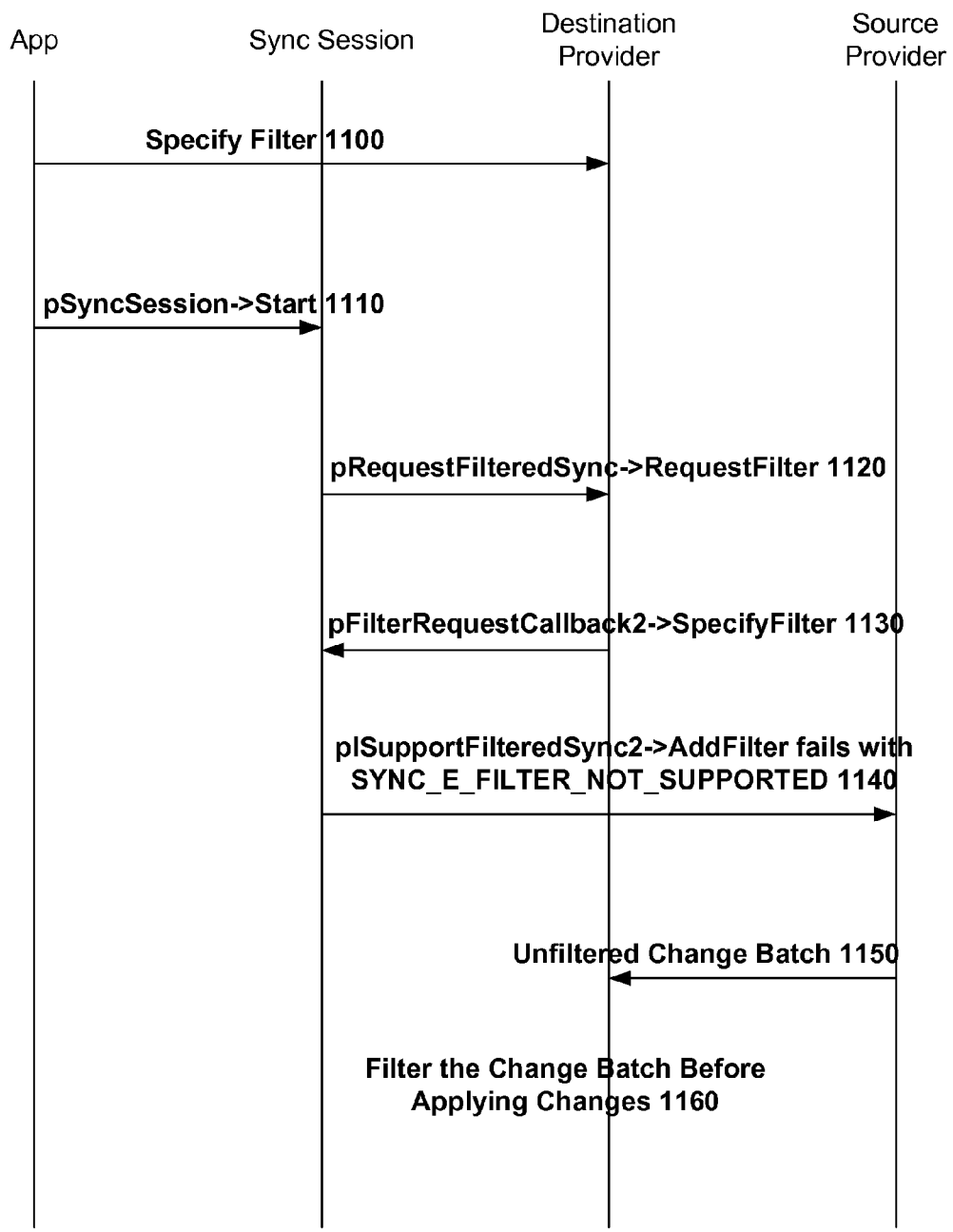
FIG. 11 is another block diagram of an component interaction for performing a knowledge exchange in an embodiment of replica tracking filters.
Figure 12:
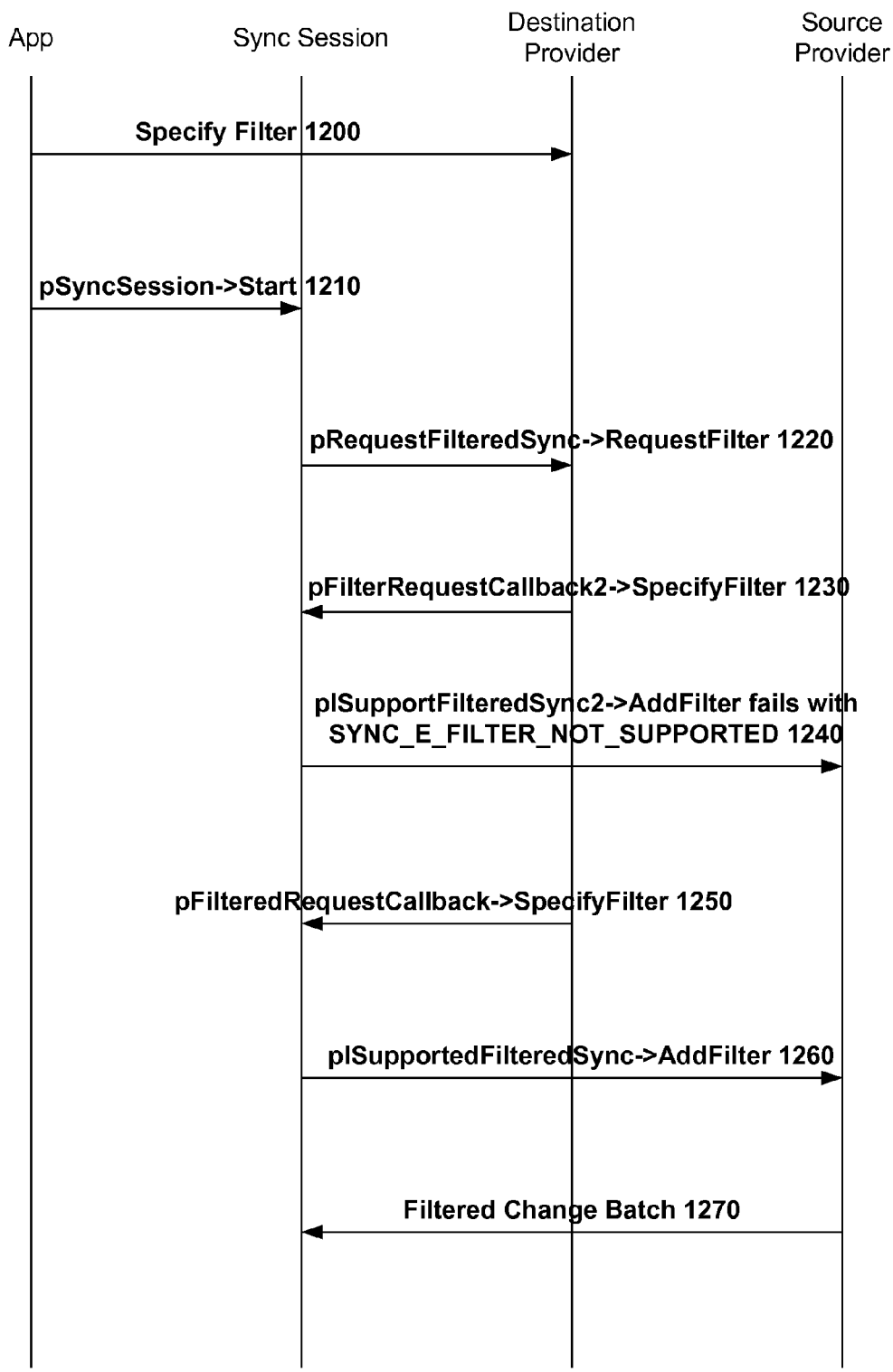
FIG. 12 is another block diagram of an component interaction for performing a knowledge exchange in an embodiment of replica tracking filters.

FIGS. 10-12 illustrate some exemplary non-limiting component interactions between an application, sync session, destination provider and source provider in accordance with one or more embodiments.

FIG. 10 illustrates a component interaction where a destination is a filtered replica, and the source tracks the filter.

At 1000, the application specifies a filter to the destination. At 1010, the application starts a sync session. At 1020, the sync session issues to the destination a pRequestFilteredSync→SpecifyFilter. At 1030, the destination returns to the sync session a pFilterRequestCallback2→RequestFilter. At 1040, the sync session sends to the source provider a pISupportFilteredSync2→AddFilter command. At 1050, the source returns a filtered change batch to the destination in response.

FIG. 11 illustrates a component interaction where a destination is a filtered replica, and the source does not track the filter.

At 1100, the application specifies a filter to the destination. At 1110, the application starts a sync session. At 1120, the sync session issues to the destination a pRequestFilteredSync→RequestFilter. At 1130, the destination returns to the sync session a pFilterRequestCallback2→SpecifyFilter. At 1140, the sync session sends to the source provider a pISupportFilteredSync2→AddFilter command, but it fails with a SYNC_E_FILTER_NOT_SUPPORTED. At 1150, the source returns an unfiltered change batch to the destination in response at which point at 1160, the destination filters the change batch before applying changes.

Where the destination is a full replica, and the source tracks the filter, the component interaction of FIG. 10 can apply.

Where the destination is a full replica, and the source does not track the filter, but evaluates the filter, this is useful in certain scenarios, for example, where music files with ratings are being synchronized. Although the destination keeps the music files, some synchronizations obtain the subset of files with rating "5*". FIG. 12 illustrates such a component interaction.

At 1200, the application specifies a filter to the destination. At 1210, the application starts a sync session. At 1220, the sync session issues to the destination a pRequestFilteredSync→RequestFilter. At 1230, the destination returns to the sync session a pFilterRequestCallback2→SpecifyFilter. At 1240, the sync session sends to the source provider a pISupportFilteredSync2→AddFilter command, but it fails with a SYNC_E_FILTER_NOT_SUPPORTED. At 1250, the destination can deliver a pFilteredRequestCallback→SpecifyFilter, to, e.g., attempt to negotiate a different filter since the previous filter suggested by the destination provider at 1230 was not supported. At 1260, the source provider can add the suggested filter by way of a pISupportedFilteredSync→AddFilter. As such, at 1260, the source returns a filtered change batch to the sync session.

Figure 13:
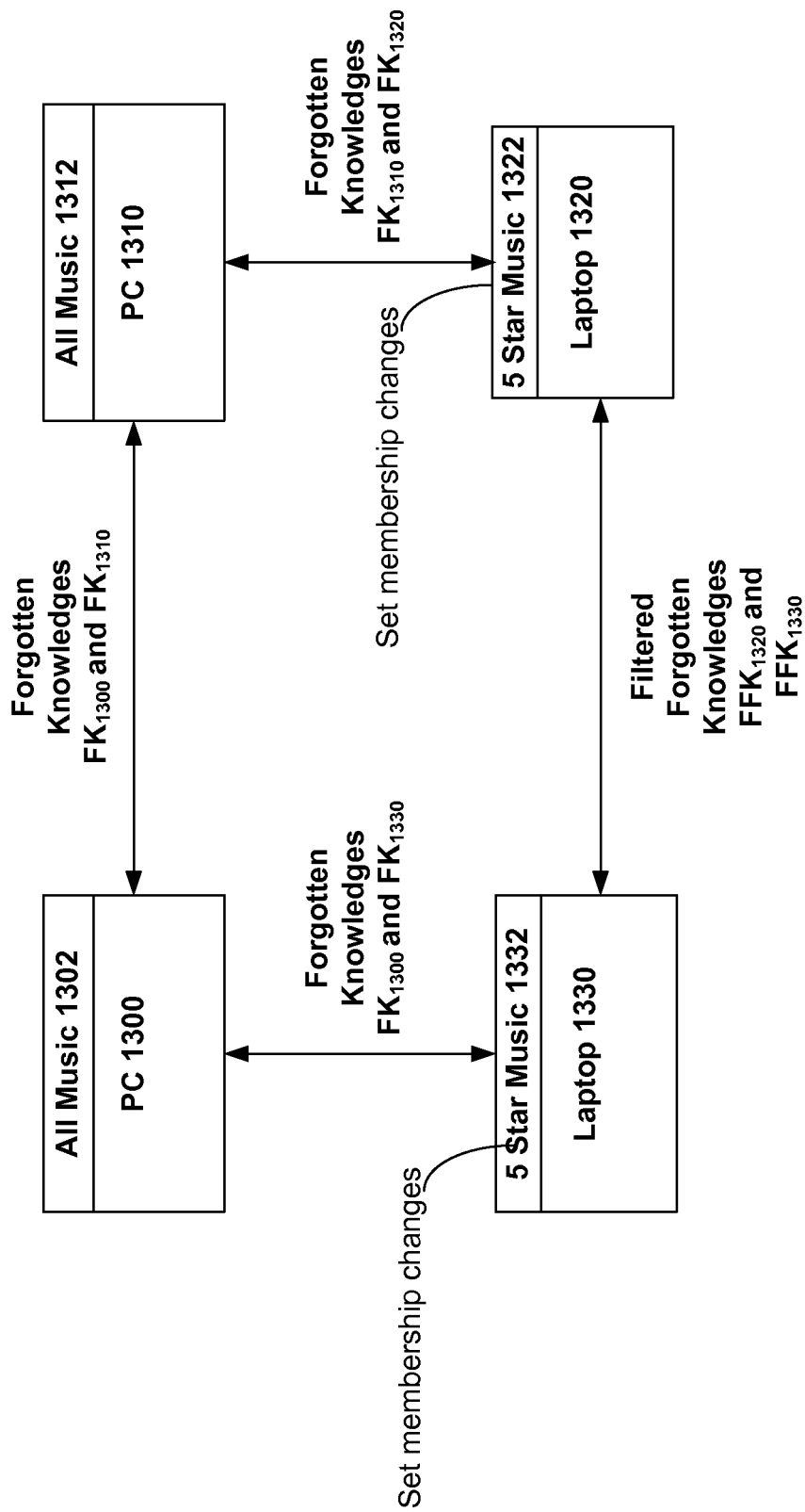
FIG. 13 is a block diagram of an exemplary knowledge exchange in the case of different replicas, some tracking the same filter, and some maintaining a full replica in an embodiment employing filter forgotten knowledge for synchronization between the devices tracking the same filter.

FIG. 13 is a block diagram of an exemplary knowledge exchange in the case of different replicas, some tracking the same filter, and some maintaining a full replica in an embodiment employing filtered forgotten knowledge for synchronization between the devices tracking the same filter. In this regard, two PCs 1300 and 1310 and two laptops 1320 and 1330 are depicted in the synchronization community. In this example, PCs 1300 and 1310 both store full sets of music 1302 and 1312, respectively, on behalf of any device of the synchronization community that wishes to synchronize, and both laptops 1320 and 1330 store only music 1322 and 1332, respectively, that has been rated with 5 stars. When any of the devices 1300, 1310, 1320 or 1330 are synchronizing, they can synchronize according to a general knowledge exchange, but in addition, they may synchronize with either forgotten knowledge or filtered forgotten knowledge depending on whether they are replicas tracking the same filter.

As shown, PCs 1300 and 1310 each store all music for a synchronization community, and thus when they synchronize with one another, in addition to synchronizing via a generic knowledge exchange, they also exchange forgotten knowledges $FK_{1300}$ and $FK_{1310}$, respectively. Similarly, when PC 1300 and laptop 1330 synchronize or when PC 1310 and laptop 1320 synchronize, they exchange forgotten knowledges $FK_{1300}$ and $FK_{1330}$, and $FK_{1320}$ and $FK_{1310}$, for their respective exchanges. However, advantageously, when laptop 1320 and laptop 1330 synchronize, in addition to the general knowledge exchange, as described above, they can exchange filtered forgotten knowledges $FFK_{1320}$ and $FFK_{1330}$, respectively, a more compact representation not representing forgotten knowledge outside of the scope of the filter being tracked by laptop 1320 and 1330.

Figure 14:
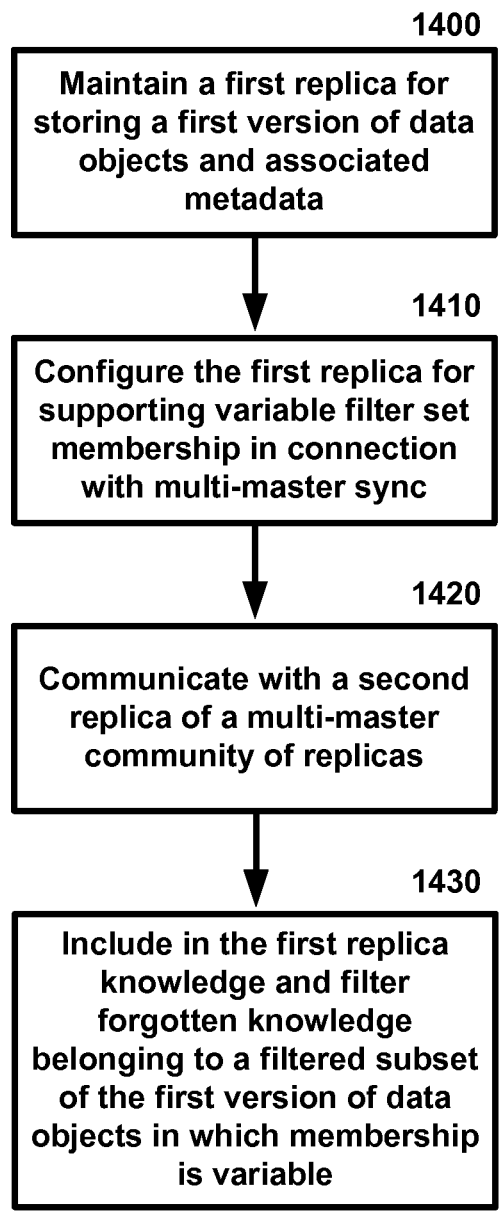
FIG. 14 is an exemplary non-limiting flow diagram illustrating the process for supporting multi-master synchronization with dynamic filter set membership in an embodiment.

FIG. 14 is an exemplary non-limiting flow diagram illustrating the process for supporting multi-master synchronization with dynamic filter set membership according to one or more embodiment. At 1400, a first replica for storing a first version of data objects and associated metadata in a computer readable storage medium can be maintained. At 1410, the first replica can be configured for supporting variable filter set membership in connection with multi-master synchronization. Thus, typically, the data objects will represent data that is collectively maintained by a community of replicas, wherein the first replica can synchronize with possibly any other replica in the community rather than, e.g., operating as or synchronization with a single master node. Moreover, the community of replicas, e.g., via syncing operations, can maintain substantially updated versions of the data objects throughout the community, which is particularly challenging when membership for a given set of data objects can vary.

At 1420, the first replica can communicate with a second replica of a multi-master community of replicas, the second replica storing a second version of data objects and associated metadata. Accordingly, changes to data objects performed at either the first replica or the second replica can be shared, and appropriate updates can be applied to the first version of data objects stored in the first replica or vice versa based upon what is known about the data objects by the first replica and second replica, respectively. In particular, at 1430, the first replica can include (1) knowledge relating to known version of data objects maintained by the multi-master community (e.g., the second replica, et al.), and (2) filter forgotten knowledge relating to purged or deleted data objects, or versions thereof, belonging to a filtered subset of the first version of data objects in which membership is variable. In addition, in one or more embodiment, the first replica can also include forgotten knowledge relating to purged or deleted objects or versions thereof. Advantageously, by maintaining knowledge, forgotten knowledge, and/or filter forgotten knowledge, the synchronizing the first replica based upon data received from the second replica can be effectuated, and vice versa.

For example, at least one of knowledge, forgotten knowledge, or the filter forgotten knowledge can be transmitted by the first replica in order to initiate a synchronization process with the second replica. Generally, the second replica can examine such data, identify potential updates to its own version of data objects, and also identify information not known to the first replica, which can be transmitted to and/or received by the first replica.

On the other hand, e.g., in cases where the second replica is the initiator of the sync, the first replica can receive at least one of the knowledge, forgotten knowledge, or the filter forgotten knowledge from the second replica during a synchronization process, perform suitable comparisons, and respond with information determined to be unknown by the second replica. In either case, the destination replica will respond to the source replica based upon a comparison of current knowledge versus either forgotten knowledge or filter forgotten knowledge. When the comparison is nominal, then a normal synchronization operation can be completed by transmitting to the source replica what is determined to be unknown to the source replica.

However, in other cases, a partial synchronization with line items exceptions can be invoked, while in still other cases, a full enumeration synchronization can be performed. For example, assuming the first replica is the destination replica (e.g., the second replica initiated the synchronization operation), then a partial synchronization with line item exceptions can be performed when knowledge received from the second replica is not contained in either forgotten knowledge or filter forgotten knowledge of the first replica. Similarly, a full enumeration synchronization can be performed when knowledge received from the second replica is not contained in either forgotten knowledge or filter forgotten knowledge of the first replica.

Regardless, it is apparent that filter forgotten knowledge can be advantageously leveraged to facilitate not only suitable filtering, but also tracking of filters to enable syncing with respect to variable set membership. For example, filter forgotten knowledge can be employed for tracking one or more filter applied to the first version of the data objects. Thus, in connection with filter forgotten knowledge, a first indication of whether a tracked data object has been in the one or more filter since a last cleanup operation for tracking the one or more filter can be maintained. In addition, a second indication of whether the tracked data object has moved out of the one or more filter for tracking the one or more filter can be maintained.

Moreover, filter forgotten knowledge can also be employed in connection with bootstrapping, such as when a replica begins to track a previously existing filter, even though, previously, the replica was not tracking the filter, and therefore can bootstrap. For example, the one or more filter can be bootstrapped by tracking an existing filter and setting knowledge relating to data objects included in the existing filter to filter forgotten knowledge relating to data object included in the existing filter. Furthermore, stale moved objects can be vacated from the one or more filter when a moved out version of the moved object that has left the one or more filter predates a last cleanup process by setting filter forgotten knowledge for the moved object to forgotten knowledge for the moved object. Advantageously, the vacating of stale moved objects can be performed concurrently with a cleanup process, which has the advantageous of converging the sets of forgotten knowledge and filter forgotten knowledge.

Figure 15:
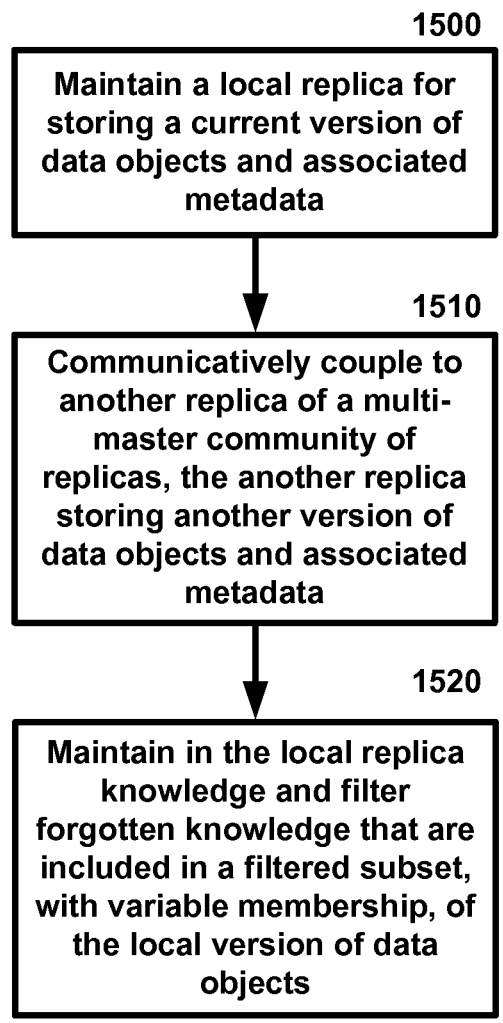
FIG. 15 is an exemplary non-limiting flow diagram illustrating the process for information exchange in the context of multiple objects with variable membership that are shared among replicas of a multi-master community in an embodiment.

FIG. 15 is an exemplary non-limiting flow diagram illustrating the process for information exchange in the context of multiple objects with variable membership that are shared among replicas of a multi-master community in an embodiment. At 1500, a local replica for storing a current version of data objects and associated metadata can be maintained. At 1510, the first replica can be communicatively coupled to an other replica of a multi-master community of replicas, the other replica storing an other version of data objects and associated metadata.

Thus, at 1520, knowledge relating to known versions of data objects maintained by the multi-master community, forgotten knowledge relating to purged data object or versions thereof, and filter forgotten knowledge relating to purged data objects, or versions thereof, that are included in a filtered subset, with variable membership, of the local version of data objects can be maintained by the local replica.

Hence, in one or more embodiment, synchronizing the local replica and the other replica according to a normal sync operation can be effectuated, such as when knowledge of a source replica is contained in either forgotten knowledge or filter forgotten knowledge of the destination replica. In other case, such as when knowledge of a source replica is not contained in either forgotten knowledge or filter forgotten knowledge of the destination replica, then various other types of synchronization procedures can be applied. For example, synchronizing the local replica and the other replica according to a partial sync operation with line item exceptions, synchronizing the local replica and the other replica according to a full enumeration operation, or the like.

Moreover, as introduced above, filter forgotten knowledge can be leveraged in various ways. For example, for tracking at least one filter applied to the data objects. Such tracking can take the form of maintaining a first indication of whether a tracked data object has been in the one or more filter since a last cleanup operation and/or maintaining a second indication of whether the tracked data object has moved out of the one or more filter for tracking the one or more filter. Regardless, set membership can be monitored to, e.g., determined whether a member of the data objects either is currently, was recently, or has never been a member of a filtered subset, all or any of which can be useful for various synchronization procedures as detailed herein.

The following presents some exemplary non-limiting APIs for the efficient synchronization of replicas with filters.

For instance, the following enums and flags can apply.

Filtering_Type

```
//
// This enum is used with filter negotiation of custom filters to indicate
// what type of filtered synchronization is requested
//
    typedef enum
    {
        //
        // Data and metadata for changes to items in the filter at the source are
included.
        //
        FT_ONLY_CURRENT_ITEMS,
        //
        // Data and metadata for changes to items in the filter at the source are
```

```
included.
            // In addition metadata (i.e. versions) are included for items that had
been in the filter
            //
            FT_CURRENT_ITEMS_AND_VERSIONS_FOR_MOVED_OUT_ITEMS
    } FILTERING_TYPE;
```

Synchronization Change Flags

The following flags can be used with IsyncChange to indicate a version (e.g., only version) is included in change batch:

```
#define SYNC_CHANGE_FLAG_VERSION_ONLY    0x00000004
```

For instance, the following are SYNC_SAVE_ACTION Values

```
            //
            // Create a ghost item.
            //
            SSA_CREATE_GHOST,
            //
            // Change live item to a ghost.
            //
            SSA_GHOST_ITEM,
            //
            // Change a ghost to a live item.
            //
            SSA_UNGHOST_ITEM,
            //
            // Update version for ghost
            //
            SSA_UPDATE_GHOST,
            //
            // Change a ghost to a tombstone
            //
            SSA_DELETE_GHOST
```

Sync_Filter_Change_Info

```
    //
    // Filter change info is used to specify filter changes
    // (e.g., change type and change version) with IsyncChange
    //
    typedef struct _SYNC_FILTER_CHANGE_INFO
    {
        //
        // True indicates item has been in the filter
        // For replicas that cleanup filter history
        // this means item has recently been in the filter
        // (e.g. more recent than forgotten knowledge)
        //
        BOOL          fHasBeenInTheFilter;
        //
        // Synchronization version for the last move out.
        // For items that are currently in the filter or has never
        // been in the filter this can be (0,0)
        //
        SYNC_VERSION   lastMoveOutVersion;
    } SYNC_FILTER_CHANGE_INFO;
```

Filter_Group_Type

Filter grouping is used to aggregate filters. In one embodiment, intersection of a custom filter with a column filter are supported.

```
    //
    // This enum is used to create aggregated filters
```

```
    //
    typedef enum
    {
        //
        // Compose a filter that is an intersection for two filters
        //
        FGT_INTERSECTION
    } FILTER_GROUPING_TYPE;
```

The following describes exemplary SYNC_FILTER_INFO flags.

Two filter info flags can be included. The first flag is used with custom filters, the second one with grouped filters.

```
    Cpp_quote("#define SYNC_FILTER_INFO_FLAG_CUSTOM 0x00000004")
        cpp_quote("#define SYNC_FILTER_INFO_COMBINED 0x00000008")
```

Interfaces implemented by 3rd parties include the following, e.g., provider writers.

IrequestFilteredSync

This interface already exists in MSF V2 CTP1. It is listed for completeness.

```
    //
    // Implemented by synchronization providers
    // It is called by synchronization framework on the destination
    // provider to do filter negotiation
    //
    interface IrequestFilteredSync : Iunknown
    {
        HRESULT SpecifyFilter(
            [in] IfilterRequestCallback * pCallback);
    }
```

IsupportFilteredSync2

```
    //
    // IsupportFilteredSync2 is implemented by providers
    // It is called by the synchronization framework on the source provider
    // during filter negotiation to see if source can produce
    // a filtered change batch with the specified filter
    //
    interface IsupportFilteredSync2 : Iunknown
    {
        HRESULT AddFilter(
            [in] Iunknown * pFilter,
            [in] FILTERING_TYPE requestedFilteringType);
    }
```

IsyncFilter

```
    //
    // IsyncFilter is implemented by 3rd parties
```

```
            // Typically providers and filters are written together
            //
            interface IsyncFilter : Iunknown
            {
                //
                // Checks whether two synchronization filters evaluate
membership identically
                //
                HRESULT IsIdentical(
                    [in] IsyncFilter *pISyncFilter);
                HRESULT Serialize(
                    [in, out, unique, size_is(*pcbSyncFilter)] BYTE *
                    pbSyncFilter, [in, out] DWORD * pcbSyncFilter);
            }
```

IsyncFilterDeserializer

```
//
// IsyncFilterDeseriazlier is implemented by 3rd parties.
// It is implemented together with IsyncFilter
// Only when the filtering scenario involves serialization and
// deserialization of synchronization filter this interface needs
// to be implemented
interface IsyncFilterDeserializer : Iunknown
{
    HRESULT DeserializeSyncFilter(
        [in, size_is(dwCbSyncFilter)] const BYTE * pbSyncFilter,
        [in] DWORD dwCbSyncFilter,
        [out] IsyncFilter ** ppISyncFilter);
}
```

IFilterTrackingProvider

```
//
// IFilterTrackingProvider is implemented by 3rd parties.
// All providers that track filters implement it
//
interface IFilterTrackingProvider : Iunknown
{
    //
    // Called by synchronization framework at the beginning of
    // synchronization session on the destination provider
    //
    HRESULT SpecifyTrackedFilters(
        [in] IfilterTrackingRequestCallback * pCallback);
    //
    // Called by synchronization framework on the source provider to
    // add destinations tracked filters
    //
    HRESULT AddTrackedFilter(
        [in] IsyncFilter * pSyncFilter);
}
```

IfilterTrackingSynchronousNotifyingChangeApplierTarget Providers that track filters can implement this interface.

```
            //
            // IfilterTrackingSynchronousNotifyingChangeApplierTarget is
            // implemented by providers that track filters. This will be
            // called both during full and filtered synchronization
            //
            interface
IfilterTrackingSynchronousNotifyingChangeApplierTarget : Iunknown
{
    //
    // Get the filter key map of the provider
    //
    HRESULT GetFilterKeyMap(
        [out] IfilterKeyMap * pIFilterKayMap);
    //
```

```
    // Get filter forgotten knowledge. Return null to indicate filter forgotten
    // knowledge is same as forgotten knowledge
    //
    HRESULT GetFilterForgottenKnowledge(
        [in] DWORD            dwFilterIndex,
        [out] IforgottenKnowledge * pIForgottenKnowledge);
    //
    // Save knowledge, forgotten knowledge, and filter forgotten
    // knowledges
    HRESULT SaveKnowledgeWithFilterForgottenKnowledges(
        [in] IsyncKnowledge      * pSyncKnowledge,
        [in] DWORD               dwFilterCount,
        [in] IforgottenKnowledge ** ppFilterForgottenKnowledges);
}
```

IfilteredReplicaSynchronousNotifyingChangeApplierTarget

```
    //
    // IfilteredReplicaNotifyingChangeApplierTarget is implemented by
    // filtered replica synchronization providers. Change applier
    // Qies for it from IsynchronousNotifyingChangeApplierTarget
    // during ApplyChanges when applying changes.
    //
    // Change applier uses it for two purposes:
    //    1) Calculate correct learned knowledge by
    //       excluding any items that have newly moved in
    //       that source does not know about
    // 2) If change batch is not filtered to determine
    //    which changes are in the filter
        //
        interface IfilteredReplicaNotifyingChangeApplierTarget :
IfilterTrackingSynchronousNotifyingChangeApplierTarget
        {
            HRESULT GetNewMoveins(
                [in] IsyncKnowledge   * pBaseKnowledge,
                [out] IenumSyncChanges ** pEnumSyncChanges);
        }
```

The following are exemplary interfaces implemented by the synchronization framework.

IfilterRequestCallback

```
//
// IfilterRequestCallback2 is implemented by synchronization framework
// It is given to the destination provider to request a filter
// during filter nogotiation
//
interface IfilterRequestCallback : Iunknown
{
    //
    // Used by destination provider to do filter negotiation
    //
    HRESULT RequestFilter(
        [in] Iunknown           * pFilter,
        [in] FILTERING_TYPE    requestedFilteringType);
}
```

IcustomFilterInfo

```
//
// IcustomFilterInfo is implemented by synchronization framework
//
interface IcustomFilterInfo : IsyncFilterInfo
{
    HRESULT GetSyncFilter(
        [out] IsyncFilter ** pISyncFilter);
}
```

IcombinedFilterInfo

```
//
// IcombinedFilterInfo is implemented by synchronization framework
//
interface IcombinedFilterInfo : IsyncFilterInfo
{
   HRESULT GetFilterCount(
      [out] DWORD    *pdwFilterCount);
   HRESULT GetFilterInfo(
      [in] DWORD              dwFilterIndex,
      [out] IsyncFilterInfo  ** ppIFilterInfo);
   HRESULT GetFilterCombinationType(
      [out] FILTER_COMBINATION_TYPE  *
      pFilterCombinationType);
}
```

IproviderCustomFilteredSyncServices

```
//
// IproviderCustomFilteredSyncServices is implemented by sync framework
//
interface IproviderCustomFilteredSyncServices : Iunknown
{
   //
   // Create a custom filter info
   //
   HRESULT CreateCustomFilterInfo(
      [in] IsyncFilter      * pSyncFilter,
      [out] IcustomFilterInfo ** ppCustomFilterInfo);
   //
   // Creates a filter combination
   // For V2, following combinations can be utilized:
   //     Custom filter intersected with a column filter
   //
   HRESULT CreateCombinedFilterInfo(
      [in] IsyncFilterInfo2    * pFilterInfo1,
      [in] IsyncFilterInfo2    * pFilterInfo2,
      [in] FILTER_COMBINATION_TYPE  filterCombinationType,
      [out] IcombinedFilterInfo    ** ppCombinedFilterInfo);
   //
   // Creates a filter map. A filter map is an index (DWORD) to
   // filter info (i.e. IsyncFilterInfo) map. A replica that
   // tracks filters will have a filter map
   //
   HRESULT CreateFilterKeyMap(
      [out] IfilterKeyMap ** ppIFilterKeyMap);
   //
   // Deserialize a filter key map
   //
   HRESULT DeserializeFilterKeyMap(
      [in] IsyncFilterDeserializer * pISyncFilterDeserializer,
      [in, size_is(dwCbFilterKeyMap)] const BYTE * pbFilterKeyMap,
      [in] DWORD dwCbFilterKeyMap,
      [out] IfilterKeyMap ** ppIFilterKeyMap);
   //
   // Deserialize a change batch with filter key map
   //
   HRESULT DeserializeChangeBatchWithFilterKeyMap(
      [in] IsyncFilterDeserializer * pISyncFilterDeserializer,
      [in, size_is(cbChangeBatch)] const BYTE * pbChangeBatch,
      [in] DWORD cbChangeBatch,
      [out] IsyncChangeBatch ** ppChangeBatch);
}
```

IfilterKeyMap

Filter key map is a map of DWORD filter index to the filter (e.g. IsyncFilterInfo).

```
//
// IfilterKeyMap is implemented by synchronization framework
// A filter map is a set of filter indexes and filter information
//
interface IfilterKeyMap : Iunknown
{
   HRESULT GetCount(
      [out] DWORD * pdwCount);
   //
   // Adds a filter info to the filter key map
   //
   HRESULT AddFilter(
      [in] IsyncFilter    * pISyncFilter,
      [out] DWORD         * pdwFilterKey);
   //
   // Gets the filter info at the specified key
   //
   HRESULT GetFilter(
      [in] DWORD             dwFilterKey,
      [out] IsyncFilter ** ppISyncFilter);
   //
   // Serializing a filter map does not serialize the rules
   //
   HRESULT Serialize(
      [in, out, unique, size_is(*pcbFilterKeyMap)] BYTE *
      pbFilterKeyMap,
      [in, out] DWORD * pcbFilterKeyMap);
}
```

IsyncChangeBatchWithFilterKeyMap

IsyncChangeBatchWithFilterKeyMap can be Qied from all sync change batch interface (i.e. IsyncChangeBatchBase, IsyncChangeBatc, IfilteredChangeBatch, IfullEnumerationChangeBatch).

```
//
// IsyncChangeBatchWithFilterKeyMap is implemented by
synchronization framework
   // It is used to set or get a filter key map from a change batch
   //
   interface IsyncChangeBatchWithFilterKeyMap : Iunknown
   {
      HRESULT GetFilterKeyMap(
         [out] IfilterKeyMap ** ppIFilterKeyMap);
      HRESULT SetFilterKeyMap(
         [in] IfilterKeyMap * pIFilterKeyMap);
      HRESULT SetFilterForgottenKnowledge(
         [in] DWORD              dwFilterKey,
         [in] IforgottenKnowledge * pIFilterForgottenKnowledge);
      HRESULT GetFilterForgottenKnowledge(
         [in] DWORD              dwFilterKey,
         [out] IforgottenKnowledge ** ppIFilterForgottenKnowledge);
      HRESULT GetLearnedFilterForgottenKnowledge(
         [in] DWORD              dwFilterKey,
         [out] IforgottenKnowledge ** ppIFilterForgottenKnowledge);
      HRESULT GetLearnedFilterForgottenKnowledgeWithPrerequisite(
         [in] DWORD              dwFilterKey,
         [in] IsyncKnowledge * pDestinationKnowledge,
         [out] IforgottenKnowledge ** ppIFilterForgottenKnowledge);
   }
```

IfilterTrackingSyncChangeBuilder

```
//
// IfilterTrackingSyncChangeBuilder is implemented by
synchronization framework
   // It can be Qied from IsyncChangeBuilder. It is used by the
   // source and destination providers to add filter change info
   //
   interface IfilterTrackingSyncChangeBuilder : Iunknown
   {
      HRESULT AddFilterChangeInfo(
         [in] const DWORD              dwFilterChangeIndex,
         [in] const SYNC_FILTER_CHANGE_INFO *
         pFilterChangeInfo);
   }
```

IfilterTrackingSaveChangeContext

```
//
// IfilterTrackingSaveChangeContext is implemented by the
synchronization framework
// It can be Qied from IsyncChangeContext or
IsyncChangeContextWithChangeUnits
// Filter tracking destinations can call this to update filter tracking
information
//
interface IfilterTrackingSaveChangeContext : Iunknown
{
    //
    // Destination provider uses this method to update
    // the filter changes for its tracked filters
    //
    // Return values:
    // S_OK - updated filter change is returned
    // S_FALSE - no update is required for filter change
    // Other - errors
    //
    HRESULT GetFilterChange(
            [in] DWORD                    dwFilterIndex,
            [out] SYNC_FILTER_CHANGE_INFO
*pSyncFilterChangeInfos);
    //
    // Returns the updated filter forgotten knowledge for a filter
    //
    HRESULT GetUpdatedFilterForgottenKnowledge(
            [in] DWORD                    dwFilterIndex,
            [out] IforgottenKnowledge ** ppFilterForgottenKnowledge);
}
```

IsyncKnowledge2

```
interface IsyncKnowledge3 : IsyncKnowledge
{
    //
    // Returns a knowledge which is a complement of the other
    //
    //      A10B15.Complement(A5B18) → A10
    // A10B15C12D18.Complement(A5B18C5D20) → A10C12
    //
    HRESULT Complement(
            [in] IsyncKnowledge * pISyncKnowledge,
            [out] IsyncKnowledge * pIComplementedKnowledge);
    //
    // Returns S_OK if the two knowledges intersect
    //              S_FALSE otherwise
    // Other HRESULTs indicate error
    //
    // For example:
    // A10B15.Intersects(B5C10) TRUE
    // A10B15.Intersects(C10) FALSE
    //
    HRESULT Intersects(
            [in] IsyncKnowledge * pISyncKnowledge);
    //
    // Add an "all change units required" marker to
    // knowledge
    //
    HRESULT AddAllChangeUnitsRequiredMarker(
    [in] BYTE* pItemId);
    //
    // Add an "all change units present" marker.
    //
    HRESULT AddAllChangeUnitsPresentMarker(
    [in] BYTE* pItemId);
    //
    // Returns
    //      S_OK - if "all change units required" marker
    //              is present in knowledge.
    // S_FALSE - if "all change units required" marker is
    //              not present for item
    // Other - on errors
    //
    //
    HRESULT ContainsAllChangeUnitsRequiredMarker(
    [in] BYTE* pItemId);
    //
    // Removes all markers from knowledge
    //
    HRESULT RemoveMarkers( );
}
```

IsynchronousNotifyingChangeApplier2

Change applier can QI the pChangeApplierTarget for IfilteredReplicaNotifyingChangeApplierTarget and IfilterTrackingSynchronousNotifyingChangeApplierTarget to take the correct action.

```
HRESULT ApplyChanges(
        [in] CONFLICT_RESOLUTION_POLICY
resolutionPolicy,
        [in] IsyncChangeBatch * pSourceChanges,
        [in] Iunknown * pUnkDataRetriever,
        [in] IenumSyncChanges * pDestinationVersions,
        [in] IsyncKnowledge * pDestinationKnowledge,
        [in] IforgottenKnowledge *
pDestinationForgottenKnowledge,
        [in] IsynchronousNotifyingChangeApplierTarget *
pChangeApplierTarget,
        [in] IsyncSessionState * pSessionState,
        [in] IsyncCallback * pCallback,
            [in] IfilterEvaluationCallback
            *pIFilterEvaluationCallback);
```

IfilteredREplicaChangeApplicationHelper

```
//
// Implemented by synchronization framework.
// Only providers that do not use change applier need to use this
interface
//
interface IfilteredReplicaChangeApplicationHelper : Iunknown
{
    HRESULT GetLearnedKnowledge(
        [out] IsyncKnowledge ** ppLearnedKnowledge);
    HRESULT GetLearnedKnowledgeWithPrerequisite(
        [in] IsyncKnowledge * pDestinationKnowledge,
        [out] IsyncKnowledge **
        ppLearnedWithPrerequisiteKnowledge);
    HRESULT GetLearnedForgottenKnowledge(
        [out] IforgottenKnowledge ** ppLearnedForgottenKnowledge);
    HRESULT GetLearnedForgottenKnowledgeWithPrerequisite(
        [in] IsyncKnowledge * pDestinationKnowledge,
        [out] IforgottenKnowledge **
ppLearnedForgottenKnowledgeWithPrerequisite);
}
```

Conflict types, and conflict resolution types can also be provided.

Some enums and flags for managed APIs can include the following

ChangeKind

A ChangeKind value Ghost can be implemented, e.g., used when enumerating a ghost (such as a version only change).

```
Public enum ChangeKind
{
    Update = 0,
    Deleted = 1,
    UnknownItem = 2,
    Ghost = 3
}
```

FilteringType

```
public enum FilteringType
{
    //
    // Only send data and metadata for items that are
    // currently in the filter at the source
    //
    CurrentItemsOnly,
    //
    // Only send data for items that are in the filter at the source
    // Send metadata (i.e. versions) for all items that had been in the filter
    //
    CurrentItemsAndVersionsForMovedOutItems
}
```

SaveChangeAction

```
        public enum SaveChangeAction
        {
                Create = CoreInterop.SYNC_SAVE_ACTION.
SSA_CREATE,
                UpdateVersionOnly =
CoreInterop.SYNC_SAVE_ACTION.
SSA_UPDATE_VERSION_ONLY,
                UpdateVersionAndData =
CoreInterop.SYNC_SAVE_ACTION.
SSA_UPDATE_VERSION_AND_DATA,
                UpdateVersionAndMergeData =
CoreInterop.SYNC_SAVE_ACTION.
SSA_UPDATE_VERSION_AND_MERGE_DATA,
                DeleteAndStoreTombstone =
CoreInterop.SYNC_SAVE_ACTION.
SSA_DELETE_AND_STORE_TOMBSTONE,
                DeleteAndRemoveTombstone =
CoreInterop.SYNC_SAVE_ACTION.
SSA_DELETE_AND_REMOVE_TOMBSTONE,
                //
                // Create a ghost item.
                //
                CreateGhost =
CoreInterop.SYNC_SAVE_ACTION.SSA_CREATE_GHOST,
                //
                // Change live item to a ghost.
                //
                GhostItem = CoreInterop.SYNC_SAVE_ACTION.
SSA_GHOST_ITEM,
                //
                // Change a ghost to a live item.
                //
                UnghostItem =
CoreInterop.SYNC_SAVE_ACTION.SSA_UNGHOST_ITEM,
                //
                // Update version for ghost
                //
                UpdateGhost =
CoreInterop.SYNC_SAVE_ACTION.SSA_UPDATE_GHOST,
                //
                // Change a ghost to a tombstone
                //
                DeleteGhost =
CoreInterop.SYNC_SAVE_ACTION.SSA_DELETE_GHOST
        }
```

FilterCombinationType

Filter combination type can be used to combine two filters. When custom filters and column filters are used in the same scenario, one creates a filter combination.

```
        Public enum FilterCombinationType
        {
                //
                // Compose a filter that is an intersection of two filters
                //
                Intersection
        }
```

The following are some interfaces that can be implemented by providers.

IrequestFilteredSync

Providers that request filtered synchronization can implement this interface.

```
        Public interface IrequestFilteredSync
        {
                void SpecifyFilter(FilterRequestCallback filterRequest);
        }
```

IsupportFilteredSync

Providers that support do filtered synchronization (e.g., can do filtered change enumeration) can implement this interface.

```
        Public interface IrequestFilteredSync
        {
                void SpecifyFilter(FilterRequestCallback filterRequest);
        }
```

IFilterTrackingProvider

Providers that track filters (including filtered replica providers) can implement this interface.

```
Public interface IFilterTrackingProvider
{
    //
    // Called on the destination provider for it to specify the
    // filters it tracks
    //
    void SpecifyTrackedFilters(
        FilterTrackingRequestCallback filterTrackingRequestCallback);
    //
    // Called on the source provider to add tracked filter
    //
    bool AddTrackedFilter(
        object filter);
}
```

IsyncFilter

Custom filter writers can implement the IsyncFilter interface.

```
        Public interface IsyncFilter
        {
                bool IsIdentical(IsyncFilter otherFilter);
        }
```

IfilterTrackingNotifyingChangeApplierTarget

Providers that track filters can implement this interface and pass it to the change applier in the ApplyChanges call.

```
Public interface IfilterTrackingNotifyingChangeApplierTarget
{
    FilterKeyMap FilterKeyMap
    {
        get;
    }
    ForgottenKnowledge GetFilterForgottenKnowledge(uint filterIndex);
    void SaveKnowledgeWithFilterForgottenKnowledges(
```

```
    SyncKnowledge   syncKnowledge,
    ForgottenKnowledge forgottenKnowledge,
    ForgottenKnowledge[ ] filterForgottenKnowledge);
  bool IsInFilter(
    uint filterIndex,
    ItemChange itemChange,
    object changeData);
}
```

IfilteredReplicaNotifyingChangeApplierTarget

Filtered replica providers can implement this interface and pass it to the change applier in the ApplyChanges call.

```
      Public interface IfilteredReplicaNotifyingChangeApplierTarget :
    IfilterTrackingNotifyingChangeApplierTarget
      {
        Ienumerator<SyncId> GetNewMoveins(SyncKnowledge
          baseKnowledge);
      }
```

The following are exemplary classes that can be implemented by the synchronization framework.

CustomFilterInfo

```
  public class CustomFilterInfo : FilterInfo, Iserializable
  {
    public CustomFilterInfo(
      SyncIdFormatGroup idFormats,
      IsyncFilter syncFilter);
    protected CustomFilterInfo(
      SerializationInfo info, StreamingContext context);
    public virtual void GetObjectData(
      SerializationInfo info, StreamingContext context);
    public IsyncFilter Filter
    {
      Get;
    }
    public static CustomFilterInfo Deserialize(byte[ ] data);
  }
```

CombinedFilterInfo

```
  public class CombinedFilterInfo : FilterInfo, Iserializable
  {
    public CombinedFilterInfo(
      FilterInfo firstFilterInfo,
      FilterInfo secondFilterInfo,
      FilterCombinationType combinationType);
    protected CombinedFilterInfo(
      SerializationInfo info, StreamingContext context);
    public virtual void GetObjectData(
      SerializationInfo info, StreamingContext context);
    public FilterCombinationType CombinationType
    {
      Get;
    }
    public FilterInfo GetFilterInfo(uint filterIndex);
    public static CombinedFilterInfo Deserialize(byte[ ] data);
  }
```

FilterKeyMap

```
    public class FilterKeyMap
    {
      //
      // Construct a filter key map
      //
      public FilterKeyMap(SyncIdFormatGroup idFormats);
      //
      // Gets the number of entries in the filter key map
      public int Count
      {
        get;
      }
      //
      // Retrieve a filter at a specific index
      //
      public IsyncFilter this[int filterIndex]
      {
        get;
      }
      //
      // Adds a filter to the filter info.
      // Return value is the index of the added filter info
      //
      public int AddFilter(IsyncFilter syncFilter);
      public byte[ ] Serialize( );
      public static FilterKeyMap Deserialize(byte[ ] data);
    }
```

FilterChange

Filter change is added to ItemChange objects to include filter tracking information that is synchronized.

```
    Public class FilterChange
    {
      //
      // Construct a filter key map
      //
      public FilterChange(bool hasBeenInTheFilter, SyncVersion
    moveOutVersion);
      //
      // Returns whether the item has been in the filter recently
      //
      public bool HasBeenInTheFilter
      {
        get;
      }
      public SyncVersion MoveOutVersion
      {
        get;
      }
    }
```

ItemChange

The following are the changes to the ItemChange class.

```
    /// <summary>
    /// Add a filter change for filter corresponding to the filter with
    /// the specified index to an ItemChange
    /// </summary>
    /// <param name="index"></param>
    /// <param name="filterchange"></param>
    public void AddFilterChange(uint index, FilterChange filterchange);
    /// <summary>
    /// Get a filter change for the filter with the specified index
    /// </summary>
    /// <param name="index"></param>
    /// <returns></returns>
    public FilterChange GetFilterChange(uint index);
    public bool AllChangeUnitsPresent
    {
      get;
      set;
    }
```

ChangeBatch

For instance, with ChangeBatch, only changes are listed.

```
public class ChangeBatch
{
  public FilterKeyMap FilterKeyMap
  {
    get;
    set;
  }
  public ForgottenKnowledge[ ] SourceFilterForgottenKnowledges
  {
    get;
    set;
  }
}
```

ChangeApplier

The following methods can be added to the NotifyingChangeApplier class.

```
Public void ApplyChanges(
    ConflictResolutionPolicy resolutionPolicy,
    ChangeBatch sourceChanges,
    IchangeDataRetriever changeDataRetriever,
    Ienumerable<ItemChange> destinationVersions,
    SyncKnowledge destinationKnowledge,
    ForgottenKnowledge destinationForgottenKnowledge,
    InotifyingChangeApplierTarget changeApplierTarget,
    IfilterTrackingNotifyingChangeApplierTarget
  filterTrackingChangeApplierTarget,
    SyncSessionContext syncSessionState,
    SyncCallbacks syncCallback);
  public void ApplyChanges(
    ConflictResolutionPolicy resolutionPolicy,
    ChangeBatch sourceChanges,
    IchangeDataRetriever changeDataRetriever,
    Ienumerable<ItemChange> destinationVersions,
    SyncKnowledge destinationKnowledge,
    ForgottenKnowledge destinationForgottenKnowledge,
    InotifyingChangeApplierTarget changeApplierTarget,
    IfilteredReplicaNotifyingChangeApplierTarget
        filteredReplicaChangeApplierTarget,
    SyncSessionContext syncSessionState,
    SyncCallbacks syncCallback);
  public void ApplyFullEnumerationChanges(
    ConflictResolutionPolicy resolutionPolicy,
    FullEnumerationChangeBatch sourceChanges,
    IchangeDataRetriever changeDataRetriever,
    Ienumerable<ItemChange> destinationVersions,
    SyncKnowledge destinationKnowledge,
    ForgottenKnowledge destinationForgottenKnowledge,
    InotifyingChangeApplierTarget changeApplierTarget,
    IfilterTrackingNotifyingChangeApplierTarget
        filterTrackingChangeApplierTarget,
    SyncSessionContext syncSessionState,
    SyncCallbacks syncCallback);
  public void ApplyFullEnumerationChanges(
    ConflictResolutionPolicy resolutionPolicy,
    FullEnumerationChangeBatch sourceChanges,
    IchangeDataRetriever changeDataRetriever,
    Ienumerable<ItemChange> destinationVersions,
    SyncKnowledge destinationKnowledge,
    ForgottenKnowledge destinationForgottenKnowledge,
    InotifyingChangeApplierTarget changeApplierTarget,
    IfilteredReplicaNotifyingChangeApplierTarget
        filteredReplicaChangeApplierTarget,
    SyncSessionContext syncSessionState,
    SyncCallbacks syncCallback);
```

The following include some exemplary methods that can be added to the SyncKnowledge class.

```
Public SyncKnowledge Complement(SyncKnowledge otherKnowledge);
public bool Intersects(SyncKnowledge otherKnowledge);
```

```
public void AddAllchangeUnitsRequiredMarker(SyncId itemId);
public void AddAllChangeUnitsPresentMarker(SyncId itemId);
public bool ContainsAllChangeUnitsRequiredMarker(SyncId itemId);
public void RemoveMarkers( );
```

Exemplary Networked and Distributed Environments

One of ordinary skill in the art can appreciate that the synchronization knowledge representation and exchange of the various embodiments can be implemented in connection with any computer or other client or server device, which can be deployed as part of a computer network, or in a distributed computing environment, connected to any kind of data store. In this regard, the various embodiments of the subject disclosure pertains to any computer system or environment having any number of memory or storage units, and any number of applications and processes occurring across any number of storage units or volumes, which may be used in connection with synchronization techniques in accordance with various embodiments. The embodiments may apply to an environment with server computers and client computers deployed in a network environment or a distributed computing environment, having remote or local storage. The various embodiments may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for synchronizing in an embodiment.

Figure 16:
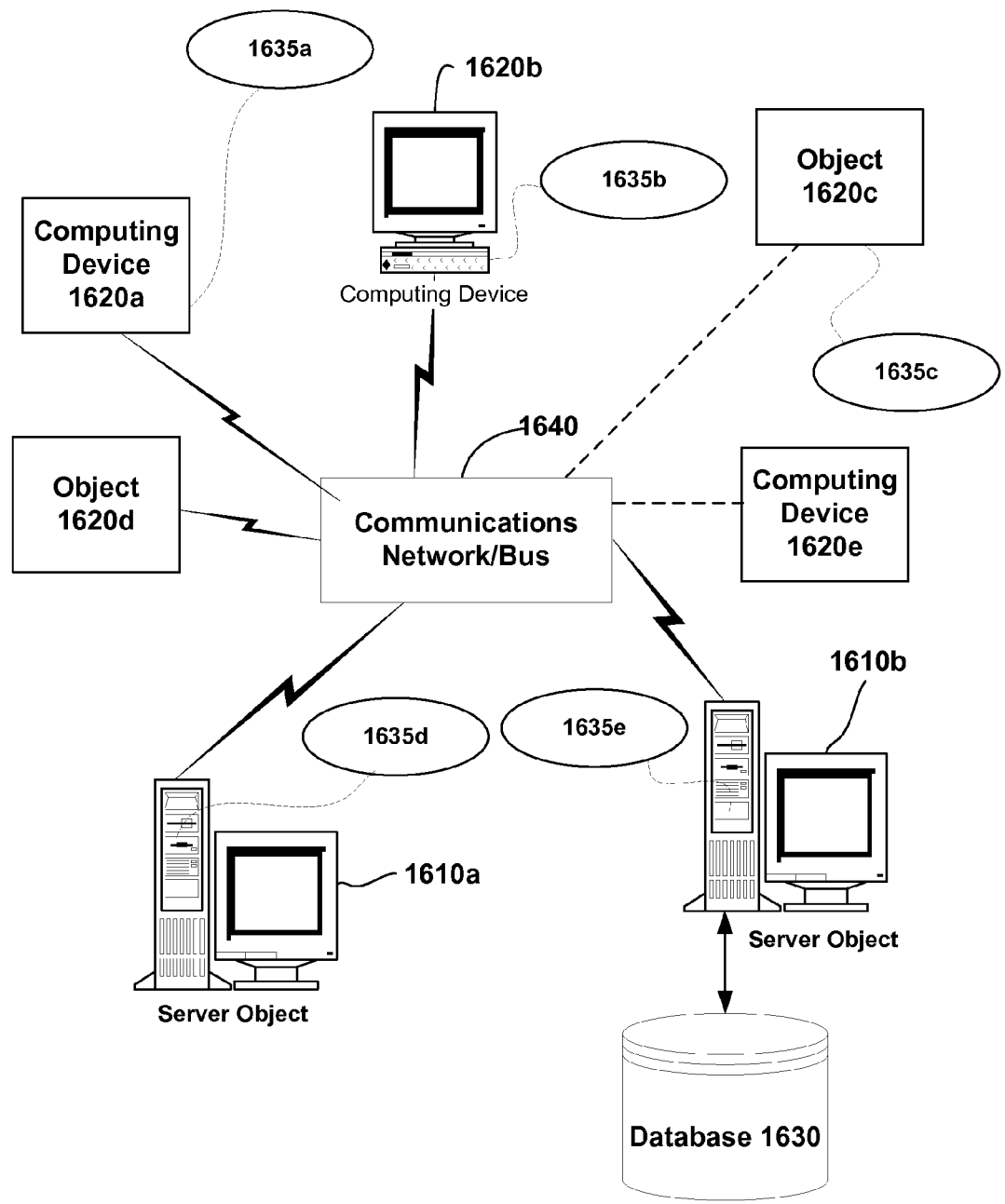
FIG. 16 is a block diagram representing an exemplary non-limiting networked environment in which the various embodiments may be implemented.

FIG. 16 provides a schematic diagram of an exemplary networked or distributed computing environment. The distributed computing environment comprises computing objects 1610a, 1610b, etc. and computing objects or devices 1620a, 1620b, 1620c, 1620d, 1620e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1640. This network may itself comprise other computing objects and computing devices that provide services to the system of FIG. 16, and may itself represent multiple interconnected networks. In accordance with an aspect, each object 1610a, 1610b, etc. or 1620a, 1620b, 1620c, 1620d, 1620e, etc. may contain an application that might make use of an API, or other object, software, firmware and/or hardware, suitable for use with the systems and methods for synchronizing with knowledge in an embodiment.

It can also be appreciated that an object, such as 1620c, may be hosted on another computing device 1610a, 1610b, etc. or 1620a, 1620b, 1620c, 1620d, 1620e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to synchronizing according to the various embodiments.

In home networking environments, there are at least four disparate network transport media that may each support one or more protocols, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.14B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1694 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices may share and communicate data in any existing manner, and no one way described in the embodiments herein is intended to be limiting.

The Internet commonly refers to the collection of networks and gateways that utilize the Transmission Control Protocol/ Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 16, as an example, computers 1620*a*, 1620*b*, 1620*c*, 1620*d*, 1620*e*, etc. can be thought of as clients and computers 1610*a*, 1610*b*, etc. can be thought of as servers where servers 1610*a*, 1610*b*, etc. maintain the data that is then replicated to client computers 1620*a*, 1620*b*, 1620*c*, 1620*d*, 1620*e*, etc., although any computer can be considered a client, a server, or both, depending on the circumstances. Any of these computing devices may be processing data or requesting services or tasks that may implicate the synchronization techniques with knowledge in an embodiment.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for synchronizing based on knowledge in an embodiment may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 16 illustrates an exemplary networked or distributed environment, with server(s) in communication with client computer (s) via a network/bus, in which the various embodiments may be employed. In more detail, a number of servers 1610*a*, 1610*b*, etc. are interconnected via a communications network/bus 1640, which may be a LAN, WAN, intranet, GSM network, the Internet, etc., with a number of client or remote computing devices 1620*a*, 1620*b*, 1620*c*, 1620*d*, 1620*e*, etc., such as a portable computer, handheld computer, thin client, networked appliance, or other device, such as a VCR, TV, oven, light, heater and the like in accordance with the various embodiments. It is thus contemplated that the various embodiments may apply to any computing device in connection with which it is desirable to synchronize any kind of data.

In a network environment in which the communications network/bus 1640 is the Internet, for example, the servers 1610*a*, 1610*b*, etc. can be Web servers with which the clients 1620*a*, 1620*b*, 1620*c*, 1620*d*, 1620*e*, etc. communicate via any of a number of known protocols such as HTTP. Servers 1610*a*, 1610*b*, etc. may also serve as clients 1620*a*, 1620*b*, 1620*c*, 1620*d*, 1620*e*, etc., as may be characteristic of a distributed computing environment.

As mentioned, communications may be wired or wireless, or a combination, where appropriate. Client devices 1620*a*, 1620*b*, 1620*c*, 1620*d*, 1620*e*, etc. may or may not communicate via communications network/bus 16, and may have independent communications associated therewith. For example, in the case of a TV or VCR, there may or may not be a networked aspect to the control thereof. Each client computer 1620*a*, 1620*b*, 1620*c*, 1620*d*, 1620*e*, etc. and server computer 1610*a*, 1610*b*, etc. may be equipped with various application program modules or objects 1635*a*, 1635*b*, 1635*c*, etc. and with connections or access to various types of storage elements or objects, across which files or data streams may be stored or to which portion(s) of files or data streams may be downloaded, transmitted or migrated. Any one or more of computers 1610a, 1610b, 1620a, 1620b, 1620c, 1620d, 1620e, etc. may be responsible for the maintenance and updating of a database 1630 or other storage element, such as a database or memory 1630 for storing data processed or saved according to one or more embodiments. Thus, various embodiments can be utilized in a computer network environment having client computers 1620a, 1620b, 1620c, 1620d, 1620e, etc. that can access and interact with a computer network/bus 1640 and server computers 1610a, 1610b, etc. that may interact with client computers 1620a, 1620b, 1620c, 1620d, 1620e, etc. and other like devices, and databases 1630.

Exemplary Computing Device

Figure 17:
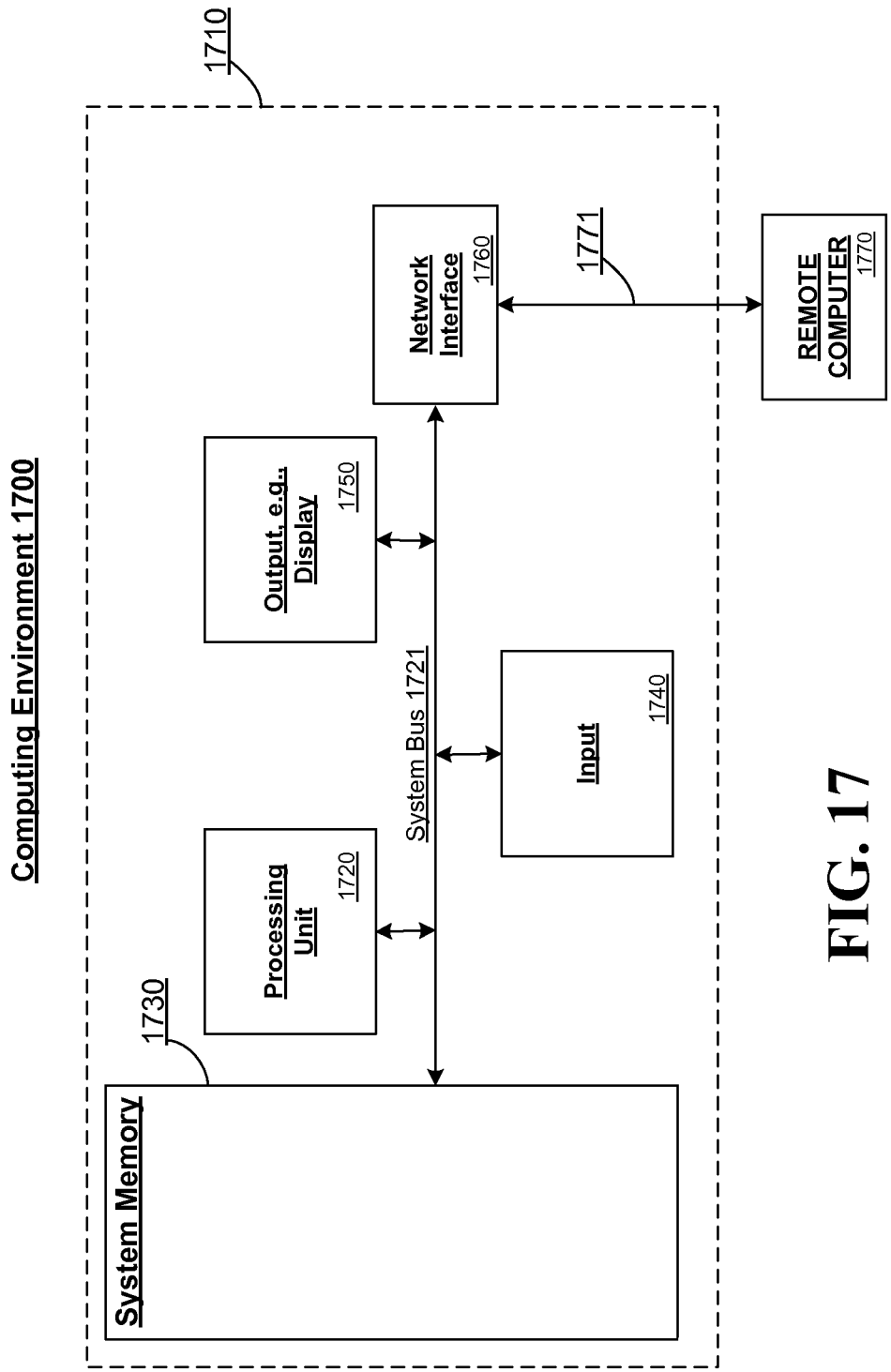
FIG. 17 is a block diagram representing an exemplary non-limiting computing system or operating environment in which the various embodiments may be implemented.

As mentioned, embodiments described herein apply to any device wherein it may be desirable to synchronize any kind of data across a set of devices. It should be understood, therefore, that handheld, portable and other computing devices and computing objects of all kinds are contemplated for use in connection with the various embodiments, i.e., anywhere that a device may benefit from sharing of data across devices or otherwise receive, process or store data. Accordingly, the below general purpose remote computer described below in FIG. 17 is but one example, and various embodiments may be implemented with any client having network/bus interoperability and interaction. Thus, one or more embodiments may be implemented in an environment of networked hosted services in which very little or minimal client resources are implicated, e.g., a networked environment in which the client device serves merely as an interface to the network/bus, such as an object placed in an appliance.

Although not required, the embodiments can partly be implemented via an operating system, for use by a developer of services for a device or object, and/or included within application software that operates in connection with the component(s) of the various embodiments. Software may be described in the general context of computer-executable instructions, such as program modules, being executed by one or more computers, such as client workstations, servers or other devices. Those skilled in the art will appreciate that the various embodiments may be practiced with other computer system configurations and protocols.

FIG. 17 thus illustrates an example of a suitable computing system environment 1700 in which one or more embodiments may be implemented, although as made clear above, the computing system environment 1700 is only one example of a suitable computing environment for a media device and is not intended to suggest any limitation as to the scope of use or functionality of the various embodiments. Neither should the computing environment 1700 be interpreted as having any dependency or requirement relating to any one or combination of components illustrated in the exemplary operating environment 1700.

With reference to FIG. 17, an exemplary remote device for implementing one or more embodiments includes a general purpose computing device in the form of a computer 1710. Components of computer 1710 may include, but are not limited to, a processing unit 1720, a system memory 1730, and a system bus 1721 that couples various system components including the system memory to the processing unit 1714. The system bus 1721 may be any of several types of bus structures including a memory bus or memory controller, a peripheral bus, and a local bus using any of a variety of bus architectures.

Computer 1710 typically includes a variety of computer readable media. Computer readable media can be any available media that can be accessed by computer 1710. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1710. Communication media typically embodies computer readable instructions, data structures, program modules or other data in a modulated data signal such as a carrier wave or other transport mechanism and includes any information delivery media.

The system memory 1730 may include computer storage media in the form of volatile and/or nonvolatile memory such as read only memory (ROM) and/or random access memory (RAM). A basic input/output system (BIOS), containing the basic routines that help to transfer information between elements within computer 1710, such as during start-up, may be stored in memory 1730. Memory 1730 typically also contains data and/or program modules that are immediately accessible to and/or presently being operated on by processing unit 1714. By way of example, and not limitation, memory 1730 may also include an operating system, application programs, other program modules, and program data.

The computer 1710 may also include other removable/non-removable, volatile/nonvolatile computer storage media. For example, computer 1710 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1721 through a non-removable memory interface such as an interface, and a magnetic disk drive or optical disk drive is typically connected to the system bus 1721 by a removable memory interface, such as an interface.

A user may enter commands and information into the computer 1710 through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1714 through user input 1740 and associated interface(s) that are coupled to the system bus 1721, but may be connected by other interface and bus structures, such as a parallel port, game port or a universal serial bus (USB). A graphics subsystem may also be connected to the system bus 1721. A monitor or other type of display device is also connected to the system bus 1721 via an interface, such as output interface 1750, which may in turn communicate with video memory. In addition to a monitor, computers may also include other peripheral output devices such as speakers and a printer, which may be connected through output interface 1750.

The computer 1710 may operate in a networked or distributed environment using logical connections to one or more other remote computers, such as remote computer 1770, which may in turn have media capabilities different from computer 1710. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1771, such local area network (LAN) or a wide area network (WAN), but may also include other networks/buses. Such networking environments are commonplace in homes, offices, enterprise-wide computer networks, intranets and the Internet.

When used in a LAN networking environment, the computer 1710 is connected to the LAN 1771 through a network interface or adapter. When used in a WAN networking environment, the computer 1710 typically includes a communications component, such as a modem, or other means for establishing communications over the WAN, such as the Internet. A communications component, such as a modem, which may be internal or external, may be connected to the system bus 1721 via the user input interface of input 1740, or other appropriate mechanism. In a networked environment, program modules depicted relative to the computer 1710, or portions thereof, may be stored in a remote memory storage device. It will be appreciated that the network connections shown and described are exemplary and other means of establishing a communications link between the computers may be used.

There are multiple ways of implementing the various embodiments, e.g., an appropriate API, tool kit, driver code, operating system, control, standalone or downloadable software object, etc. which enables applications and services to use the systems and methods for representing and exchanging knowledge in an embodiment. The various embodiments contemplate use from the standpoint of an API (or other software object), as well as from a software or hardware object that performs the knowledge exchange in an embodiment. Thus, various implementations described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments have been described in connection with various computing devices and network architectures, the underlying concepts may be applied to any computing device or system in which it is desirable to synchronize data with another computing device or system. For instance, the synchronization processes may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the various embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing one or more embodiments described herein. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization services and/or processes of the various embodiments, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the various embodiments may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing one or more embodiments. When implemented on a general-purpose processor, the program code combines with the processor to provide a unique apparatus that operates to invoke the functionality of one or more embodiments. Additionally, any storage techniques used in connection with the various embodiments may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 7, 14 and 15. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the various embodiments have been described in connection with the preferred embodiments of the various figures, it is to be understood that other similar embodiments may be used or modifications and additions may be made to the described embodiment for performing the same function without deviating therefrom. For example, while exemplary network environments are described in the context of a networked environment, such as a peer to peer networked environment, one skilled in the art will recognize that the various embodiments are not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to the context of particular programming language constructs, the various embodiments are not so limited, but rather may be implemented in any language to provide methods for representing and exchanging knowledge for a set of nodes in an embodiment. Still further, the various embodiments may be implemented in or across a plurality of processing chips or devices, and storage may similarly be effected across a plurality of devices. Therefore, the subject disclosure and detailed description should not be limited to any single embodiment.

What is claimed is:

1. A computing device, comprising:
at least one processor;
memory that stores modules for execution by the at least one processor, the modules including:
a sync module configured to support variable membership in a filter set in connection with multi-master synchronization, configured to maintain filter forgotten knowledge, where forgotten knowledge supports synchronization of knowledge by the sync module with one or more other sync modules and the filter forgotten knowledge supports synchronization of filtered knowledge by the sync module with one or more other sync modules, and configured to communicatively couple to a local replica that stores a local version of a set of data objects and associated metadata, the sync module comprising:
a communications module configured to communicate with at least one other sync module included in a multi-master community of sync modules; and
an analysis module configured to manage information associated with the set of data objects, wherein the information includes (1) knowledge that pertains to at least one version of the set of data objects received from the at least one other sync module, and (2) filter forgotten knowledge that pertains to deleted data objects, or versions thereof, that belong to filtered knowledge, which is a filtered subset of the set of data objects in which membership is dynamic;
the sync module being further configured to synchronize the local replica based upon information received from the at least one other sync module.

2. The computing device of claim 1, wherein the information further includes forgotten knowledge that pertains to deleted data objects or versions thereof.

3. The computing device of claim 1, wherein the information is metadata associated with changes to the set of data objects or versions thereof.

4. The computing device of claim 1, wherein the sync module is configured to initiate a synchronization procedure with the at least one other sync module by way of a change request and transmits the information to the at least one other sync module.

5. The computing device of claim 1, wherein the sync module is configured to at least one of (1) respond to a synchronization procedure requested by the at least one other sync module based upon receipt of a change request that includes at least one of knowledge, forgotten knowledge, or filter forgotten knowledge associated with the at least one other sync module, (2) perform a comparison between data included in the change request and data included in the local replica; or (3) transmit data determined to be unknown to the at least one other sync module based upon the comparison by way of a change conveyance.

6. The computing device of claim 5, wherein the sync module is configured to compare received knowledge from the at least one other sync module to either forgotten knowledge or filter forgotten knowledge included in the local replica in order to perform the comparison, and to (1) perform a normal sync when the received knowledge is contained in the forgotten knowledge or filter forgotten knowledge; (2) perform a synch with line item exceptions when the received knowledge is not contained in the forgotten knowledge or not contained in the filter forgotten knowledge; or (3) perform a full enumeration sync when the received knowledge is not contained in the forgotten knowledge or not contained in the filter forgotten knowledge.

7. The computing device of claim 1, wherein the sync module further comprising a tracking module configured to monitor at least one filter applied to the set of data objects.

8. The computing device of claim 7, wherein the tracking module is further configured to maintain a data table related to filtered data objects, wherein the table includes at least one of (1) an item ID that uniquely describes a filtered data object; (2) a creation version that denotes a sync module ID and an indication of time associated with creation of the filtered data object; (3) a last update version that relates to a sync module ID, and an indication of time associated with an update to or versioning of the filtered data object; (4) an indication of presence or recent presence of the filtered data object in the at least one filter; or (5) a move out version that relates to either a sync module ID and an indication of time associated with a change to the filtered data object that removes the filtered data object from the at least one filter or a null value or another value that indicates the filtered data object has not ever, or not recently, been in the at least one filter.

9. The computing device of claim 8, wherein the tracking module is further configured to bootstrap the at least one filter in order to track preexisting filters, wherein the tracking module sets filter forgotten knowledge associated with data objects included in the filter to knowledge associated with the data objects included in the filter.

10. The computing device of claim 8, wherein the tracking module is further configured to set filter forgotten knowledge of a moved data object to the move out version of the moved data object in order to treat the moved data object as though the moved data object never existed in the at least one filter.

11. The computing device of claim 1, wherein the local replica is a full replica configured to maintain all data managed by the multi-master community and a remote replica associated with the at least one other sync module is a filtered replica configured to maintain a subset of the data managed by the multi-master community based upon at least one filter applied to the set of data objects.

12. The computing device of claim 1, wherein the local replica is a filtered replica configured to maintain a subset of data managed by the multi-master community based upon at least one filter applied to the set of data objects and a remote replica associated with the at least one other sync module is a full replica configured to maintain all data managed by the multi-master community.

13. A method, comprising:
maintaining a first replica for storing a first version of data objects and associated metadata in a computer readable storage medium;
configuring the first replica for supporting variable membership in a filter set in connection with multi-master synchronization;
communicating by a first sync module associated with the first replica with a second sync module associated with a second replica of a multi-master community of replicas, the second replica storing a second version of data objects and associated metadata;
including in the first replica knowledge relating to known versions of data objects maintained by the multi-master community and filter forgotten knowledge relating to purged data objects belonging to a filtered subset of the first version of data objects in which membership is dynamic, where forgotten knowledge supports synchronization of knowledge between the first and second replicas and the filter forgotten knowledge supports synchronization of filtered knowledge between the first and second replicas; and
synchronizing by the first sync module the first replica with the second replica based upon information received from the second sync module;
at least one of the maintaining, configuring, communicating, including and synchronizing steps being executed by a processor.

14. The method of claim 13, further comprising at least one of the following:
including in the first replica forgotten knowledge relating to purged data objects or version thereof;
transmitting at least one of the knowledge, forgotten knowledge, or the filter forgotten knowledge to initiate a synchronization process with the second replica;
receiving at least one of the knowledge, forgotten knowledge, or the filter forgotten knowledge from the second replica during a synchronization process, and responding with information determined to be unknown by the second replica;
performing a partial synchronization with line item exceptions when knowledge received from the second replica is not contained in either forgotten knowledge or filter forgotten knowledge of the first replica; or
performing a full enumeration synchronization when knowledge received from the second replica is not contained in either forgotten knowledge or filter forgotten knowledge of the first replica.

15. The method of claim 13, further comprising at least one of the following:
employing filter forgotten knowledge for tracking one or more filter applied to the first version of the data objects;
maintaining a first indication of whether a tracked data object has been in the one or more filter since a last cleanup operation for tracking the one or more filter;
maintaining a second indication of whether the tracked data object has moved out of the one or more filter for tracking the one or more filter;
bootstrapping the one or more filter by tracking an existing filter and setting knowledge relating to data objects included in the existing filter to filter forgotten knowledge relating to data object included in the existing filter;
vacating stale moved objects from the one or more filter when a moved out version of the moved object that has left the one or more filter predates a last cleanup process by setting filter forgotten knowledge for the moved object to forgotten knowledge for the moved object; or
performing the vacating concurrently with a cleanup process.

16. A method, comprising:
maintaining a local replica for storing a current version of data objects and associated metadata;
communicatively coupling by a first sync module associated with the local replica to a second sync module associated with an other replica of a multi-master community of replicas, the other replica storing an other version of data objects and associated metadata;

maintaining in the local replica knowledge relating to known versions of data objects maintained by the multi-master community, forgotten knowledge relating to purged data object or versions thereof, and filter forgotten knowledge relating to purged data objects, or versions thereof, that are included in a filtered subset, with dynamic membership, of the local version of data objects, where forgotten knowledge supports synchronization of knowledge between the local replica and an other replica and the filter forgotten knowledge supports synchronization of filtered knowledge between the local replica and an other replica; and synchronizing by the first sync module the local replica and the other replica based upon information received from the second sync module;

at least one of the maintaining, coupling and synchronizing steps being executed by a processor.

17. The method of claim 16, wherein synchronizing the local replica and the other replica comprises at least one of the following:

synchronizing the local replica and the other replica according to a normal sync operation;

synchronizing the local replica and the other replica according to a partial sync operation with line item exceptions; or synchronizing the local replica and the other replica according to a full enumeration operation.

18. The method of claim 16, further comprising at least one of the following:

tracking at least one filter applied to the data objects;

maintaining a first indication of whether a tracked data object has been in the one or more filter since a last cleanup operation; or maintaining a second indication of whether the tracked data object has moved out of the one or more filter for tracking the one or more filter.

19. The method of claim 16, further comprising at least one of the following:

bootstrapping a preexisting filter included in the at least one filter;

vacating stale moved objects from the at least one filter; or performing the vacating contemporaneously with a cleanup operation.

* * * * *